US011513655B2

(12) United States Patent
Narayanan et al.

(10) Patent No.: US 11,513,655 B2
(45) Date of Patent: Nov. 29, 2022

(54) SIMPLIFIED USER INTERFACE GENERATION

(71) Applicant: Google LLC, Mountain View, CA (US)

(72) Inventors: Ajit Narayanan, Mountain View, CA (US); Xiang Xiao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/913,752

(22) Filed: Jun. 26, 2020

(65) Prior Publication Data

US 2021/0405825 A1    Dec. 30, 2021

(51) Int. Cl.
     *G06F 3/0481*      (2022.01)
     *G06N 20/00*      (2019.01)
     *G06F 9/451*      (2018.01)

(52) U.S. Cl.
     CPC ............ *G06F 3/0481* (2013.01); *G06F 9/451* (2018.02); *G06N 20/00* (2019.01)

(58) Field of Classification Search
     CPC ........ G06F 3/0481; G06F 9/451; G06N 20/00
     See application file for complete search history.

(56) References Cited

U.S. PATENT DOCUMENTS

| | | | | |
|---|---|---|---|---|
| 7,024,633 B1* | 4/2006 | Mann | ......................... | G06F 8/34 715/764 |
| 7,552,420 B1* | 6/2009 | Smith | ................. | G06F 9/44505 717/121 |
| 8,881,021 B1* | 11/2014 | Das | ..................... | G06F 16/9535 715/744 |
| 9,063,726 B1 | 6/2015 | Stepanov et al. | | |
| 9,195,362 B2 | 11/2015 | Lewin et al. | | |
| 9,753,605 B2 | 9/2017 | Chen et al. | | |
| 2003/0046401 A1 | 3/2003 | Abbott et al. | | |
| 2007/0136686 A1* | 6/2007 | Price | ....................... | G06F 3/038 715/808 |
| 2008/0098319 A1* | 4/2008 | Lucas | ................... | G06F 3/0481 715/765 |
| 2009/0241135 A1* | 9/2009 | Wong | ...................... | G06F 9/451 719/328 |
| 2010/0162165 A1* | 6/2010 | Addala | ................... | G06F 9/451 715/810 |

(Continued)

FOREIGN PATENT DOCUMENTS

CN            106155686       11/2016

*Primary Examiner* — Eric J. Bycer
(74) *Attorney, Agent, or Firm* — Dority & Manning, P.A.

(57) ABSTRACT

Methods, systems, devices, and tangible non-transitory computer readable media for route planning are provided. The disclosed technology can include accessing user interface data that includes states of interface elements associated with a user interface. Further, the state of the user interface can be determined based at least in part on the user interface data. The state of the user interface can include functionalities of the interface elements. The interface elements can be mapped to simplified user interface elements on the based at least in part on the functionalities of the interface elements. Furthermore, a simplified user interface can be generated based at least in part on the simplified user interface elements. The simplified user interface elements can be configured to perform operations associated with the functionalities of the interface elements.

20 Claims, 17 Drawing Sheets

(56) References Cited

U.S. PATENT DOCUMENTS

| | | | |
|---|---|---|---|
| 2011/0107244 A1 | 5/2011 | Kinoshita et al. | |
| 2011/0185294 A1* | 7/2011 | Binder | G06F 8/38 |
| | | | 715/762 |
| 2012/0016678 A1* | 1/2012 | Gruber | G06F 9/54 |
| | | | 704/275 |
| 2012/0166522 A1* | 6/2012 | MacLaurin | G06F 3/048 |
| | | | 709/203 |
| 2012/0265528 A1* | 10/2012 | Gruber | G10L 15/183 |
| | | | 704/235 |
| 2013/0055117 A1 | 2/2013 | Sahibzada | |
| 2014/0101617 A1 | 1/2014 | Yang et al. | |
| 2014/0201672 A1* | 7/2014 | Borzello | G06F 3/04842 |
| | | | 715/779 |
| 2015/0277702 A1 | 10/2015 | Hardwick et al. | |
| 2017/0017349 A1* | 1/2017 | Ciano | G06F 9/451 |
| 2017/0124474 A1* | 5/2017 | Kashyap | G06N 20/00 |
| 2017/0228107 A1* | 8/2017 | Bhati | G06F 3/0481 |
| 2018/0365025 A1* | 12/2018 | Almecija | G06F 9/451 |
| 2019/0012047 A1* | 1/2019 | Rodgers | G06F 16/116 |
| 2019/0384622 A1* | 12/2019 | Chen | G06F 3/0482 |
| 2020/0341779 A1* | 10/2020 | Rohde | G06F 11/3466 |
| 2020/0348805 A1* | 11/2020 | Reicher | G06F 3/0481 |

\* cited by examiner

SIMPLIFIED USER INTERFACE GENERATION

FIELD

The present disclosure relates generally to the generation of user interfaces. More particularly, the present disclosure relates to generating simplified user interfaces.

BACKGROUND

Applications, including software applications, can be implemented on a variety of computing devices (e.g., smartphones, tablet computing devices, or wearable computing devices). These applications can perform a variety of functions and can include a user interface that allows a user to interact with the application and perform operations including controlling certain aspects of the application. However, applications and the way in which the applications are used can change over time, which may create a need for different ways of interacting with the applications. Further, certain users may find certain user interfaces confusing, cluttered, or otherwise too complex to permit intuitive, convenient, and/or useful interaction between the user and the interface. Accordingly, there exists a demand for a more effective way of interacting with an application, and in particular a need for a more effective user interface that facilitates user interaction with the application.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of user interface generation. The computer-implemented method can include accessing, by a user computing device associated with a user and comprising one or more processors, user interface data comprising one or more states of a user interface comprising one or more interface elements. The computer-implemented method can include determining, by the user computing device, a state of the user interface based at least in part on the user interface data. The state of the user interface can include one or more functionalities of the one or more interface elements. The computer-implemented method can include mapping, by the user computing device, the one or more interface elements to one or more simplified user interface elements based at least in part on the one or more functionalities of the one or more interface elements. Furthermore, the computer-implemented method can include generating, by the user computing device, a simplified user interface based at least in part on the one or more simplified user interface elements. The one or more simplified user interface elements can be configured to perform one or more operations associated with the one or more functionalities of the one or more interface elements.

Another example aspect of the present disclosure is directed to one or more tangible non-transitory computer-readable media storing computer-readable instructions that when executed by one or more processors cause the one or more processors to perform operations. The operations can include accessing user interface data comprising one or more states of a user interface comprising one or more interface elements. The operations can include determining, by the user computing device, a state of the user interface based at least in part on the user interface data. The state of the user interface can include one or more functionalities of the one or more interface elements. The operations can include mapping, by the user computing device, the one or more interface elements to one or more simplified user interface elements based at least in part on the one or more functionalities of the one or more interface elements. Furthermore, the operations can include generating, by the user computing device, a simplified user interface based at least in part on the one or more simplified user interface elements. The one or more simplified user interface elements can be configured to perform one or more operations associated with the one or more functionalities of the one or more interface elements.

Another example aspect of the present disclosure is directed to a computing system comprising: one or more processors; one or more non-transitory computer-readable media storing instructions that when executed by the one or more processors cause the one or more processors to perform operations. The operations can include accessing user interface data comprising one or more states of a user interface comprising one or more interface elements. The operations can include determining, by the user computing device, a state of the user interface based at least in part on the user interface data. The state of the user interface can include one or more functionalities of the one or more interface elements. The operations can include mapping, by the user computing device, the one or more interface elements to one or more simplified user interface elements based at least in part on the one or more functionalities of the one or more interface elements. Furthermore, the operations can include generating, by the user computing device, a simplified user interface based at least in part on the one or more simplified user interface elements. The one or more simplified user interface elements can be configured to perform one or more operations associated with the one or more functionalities of the one or more interface elements.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
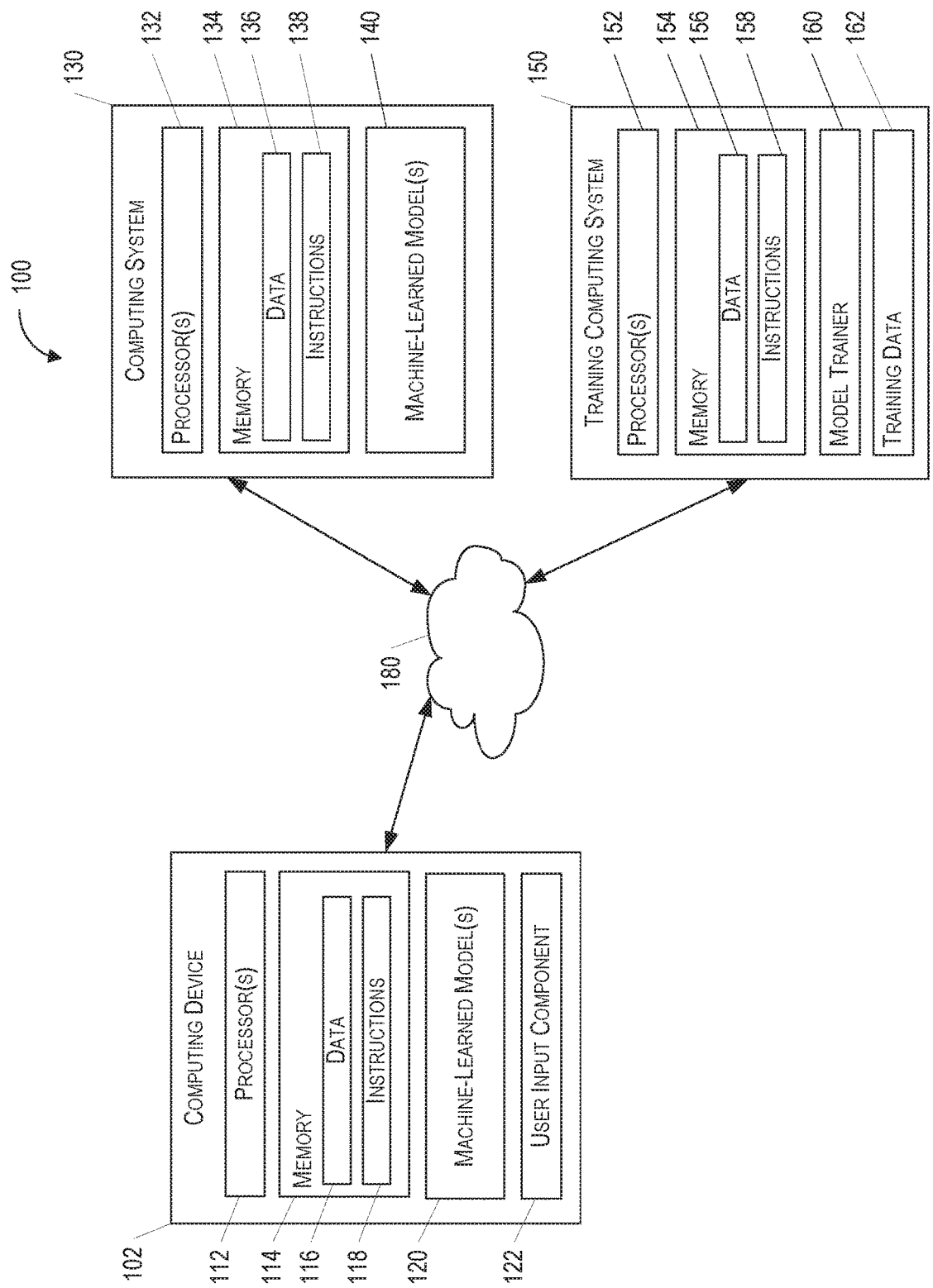
FIG. 1A depicts a block diagram of an example computing system that performs operations associated with the generation of a simplified user interface according to example embodiments of the present disclosure.

Reference numerals that are repeated across plural figures are intended to identify the same features in various implementations.

DETAILED DESCRIPTION

Generally, the present disclosure is directed to the generation of user interfaces including simplified user interfaces. Example aspects of the present disclosure are directed to a simplified user interface generation system that can be used to generate a simplified user interface based on the state of an existing user interface. In some implementations, the simplified user interface generation system can be located on and executed locally by a user's computing device (e.g., smartphone) to augment or replace user interfaces presented by application(s) on the user's computing device. Additionally or alternatively, the simplified user interface generation system can be located at a server computing system and can serve the simplified user interfaces to client devices such as user devices. According to another aspect, in some implementations, the simplified user interface generation system can include and leverage one or more machine-learned models (e.g., "on-device" machine learned models) to generate the simplified user interface(s). For example, a machine-learned model can learn to map current state(s) and/or element(s) of an existing user interface to state(s) and/or element(s) (e.g., a reduced number of elements) of a simplified user interface.

In particular, the disclosed technology can be used to determine the state of a user interface and generate a simplified user interface that can perform tasks associated with the interface elements of the user interface. For example, a simplified user interface can be generated that reduces the number of interface elements with which a user will interact. Further, the interface elements that make up the simplified user interface can be determined based on which interface elements are most relevant within the context of the user interface.

The simplified interface can be presented to the user. For example, the simplified interface can be presented in addition to and/or in correspondence with the existing user interface such as, e.g., overlaid upon the existing interface. Alternatively, the simplified user interface can replace the existing user interface. In one example, the simplified interface can be an "action bar" that is presented (e.g., at a bottom of a current display screen) and which includes the most important control options for a user. As such, the disclosed technology can ensure that a user is provided with a simplified user interface that can facilitate user interactions to perform tasks in an application.

The disclosed technology can be implemented in a computing system or computing device (e.g., a user computing device) that is configured to access data, perform operations on the data (e.g., determining the state of a user interface and map user interface elements to simplified user interface elements), and generate output including a simplified user interface. Further, the computing system can be included in a computing device (e.g., a personal computing device including a smartphone) or as part of a system that includes multiple devices that can communicate and/or interact with one another.

By way of example, the disclosed technology can include a user computing device that accesses user interface data that includes information associated with the state of a user interface. The user interface can be presented to the user in a visual medium such as a graphical user interface that is displayed on a display device. Further, the user computing device can determine the state of the user interface based on the user interface data which can include information associated with the inputs and outputs that the user interface is respectively able to receive and generate. For example, the user interface can receive touch inputs via a touch-screen display and generate visual and auditory outputs in response to the touch inputs. The user computing can then map interface elements included in the user interface (e.g., control elements that a user can use to activate applications) to simplified user interface elements that perform the tasks of their corresponding interface elements and which can be presented in a form that is simpler and easier to interact with. The user computing device can then generate a simplified user interface that is based on the simplified user interface elements and which can be used to perform tasks associated with the user interface. In this way, the disclosed technology can present the user with a simplified user interface that facilitates the user's interactions with the computing device and allows the user to more effectively perform tasks.

The simplified user interface generated by the disclosed technology can include a subset of interface elements (e.g., interface controls used to provide input to the user interface and/or application) of the user interface that are presented in a standardized and consistent way, thereby facilitating user interactions with the user interface. In addition to these interface elements, the simplified user interface can also provide a simplified interface to communicate task-specific inputs and outputs between the user and the software.

In some implementations of the disclosed technology, a simplified user interface can be based at least in part on a simplified user interface creation service that operates in the background of a computing device's operating system and monitors the state of the user interface. Whenever the state of the user interface changes, the simplified user interface creation service can determine the type and/or class of the user interface that is being presented and selects an appropriate simplified user interface template based on the type or class. Further, an action prediction service can analyze the user interface and rank different elements based on how likely those elements are to be activated by a user. Further, an interface element understanding service can assign a class to the interface elements and determine a corresponding simplified user interface element (e.g., a control represented by an onscreen icon) representative icon for the respective interface elements. The simplified user interface can then be generated based on these simplified user interface elements.

The disclosed technology can include a user interface state detector, that can determine and/or detect whether the current user interface state is the same state as the user interface state for which a simplified user interface configuration was stored. On a positive determination, the appropriate simplified user interface can be generated. Further, the disclosed technology can include an interface element mapper that can map a simplified user interface element on the simplified user interface to an interface element on the (un-simplified) user interface.

Accordingly, the disclosed technology can improve the ergonomics and efficiency of user interaction with an interface by providing a user with a simplified user interface that can be generated based on a variety of factors including a user's probable interactions with the interface and the current layout of the interface. Further, the disclosed technology can assist a user in more effectively performing the technical task of interacting with a user interface to facilitate the performance of tasks that are controlled via the user interface by way of a continued and/or guided human-machine interaction process.

The user computing device can access, receive, retrieve, and/or obtain data including user interface data. The user interface data can include one or more states of a user interface that includes one or more interface elements. The user interface data can include one or more features and/or one or more attributes of the user interface including one or more features and/or one or more attributes of the one or more interface elements. For example, the one or more features of the user interface can include per-pixel information including the color and location of each pixel of a plurality of pixels used to display the user interface. By way of further example, the one or more attributes of the user interface can include a layout of the one or more interface elements, which in some embodiments can be included as part of a tree hierarchy or node hierarchy that describes one or more relationships between the one or more interface elements.

The user computing device can determine a state of the user interface based at least in part on the user interface data. Further, the user computing device can use the user interface data to determine information that is associated with one or more inputs that can be provided to the user interface (e.g., voice inputs and/or tactile inputs), one or more outputs (e.g., one or more visual outputs and/or auditory outputs) of the user interface, one or more operations, and/or one or more tasks (e.g., one or more information retrieval tasks, application operation tasks (e.g., opening and/or closing applications), and/or communications tasks (e.g., sending information to and/or receiving information from an application)).

The state of the user interface can include one or more functionalities of the user interface. The one or more functionalities of the user interface can include one or more inputs that the user interface can receive (e.g., tactile interactions by a user with an interface element and/or data received by the user interface from an application); one or more outputs that the user interface can generate (e.g., visual outputs to a display portion of the user interface and/or data sent to an application by the user interface); and/or one or more operations that can be performed by one or more applications associated with the user interface. Further, the one or more inputs can include one or more task-directed inputs and/or one or more task-auxiliary inputs; and the one or more outputs can include one or more task-directed outputs and/or one or more task-auxiliary outputs.

The one or more task-directed inputs and/or the one or more task-directed outputs can be associated with one or more tasks that are extrinsic to user interaction with the user interface. In some embodiments, the one or more task-directed inputs and/or the one or more task-directed outputs can be intrinsic to the one or more tasks. For example, the one or more task-directed outputs can include one or more outputs such as showing a visual representation of a destination location in a mapping and routing application. Further, the one or more task-directed inputs and/or the one or more task-directed outputs can perform functions and/or operations that are required to perform a task. For example, a task directed input can include receiving an input indicating a destination to which a user would like to travel from their current location.

The one or more task-auxiliary inputs and/or the one or more task-auxiliary outputs can be associated with one or more tasks that are not extrinsic to user interaction with the user interface. Further, the one or more task-auxiliary inputs and/or the one or more task-auxiliary outputs can perform functions and/or operations that are not required to perform a task and that may be directed to interaction with the user interface itself. For example, a task-auxiliary input can include changing from earpiece to speaker mode via the user interface of a telephone application.

In some embodiments, the user interface can be configured to receive one or more task-directed inputs and/or one or more task-auxiliary inputs. For example, the user interface can receive one or more task-directed inputs comprising information associated with the location of the user device for a user interface of a mapping application. By way of further example, the user interface can receive one or more task-auxiliary inputs comprising a user interaction to a map magnification interface element that is used to control the magnification (e.g., zoom level) for a user interface of the mapping application.

Further, the user interface can be configured to generate one or more task-directed outputs and/or one or more task-auxiliary outputs. For example, the user interface can generate one or more task-directed outputs comprising audio indicating the location of the user device for a user interface of a mapping application. By way of further example, the user interface can generate one or more task-auxiliary outputs comprising displaying a magnified image of a map in response to receiving a user input to zoom into the map of the user interface of the mapping application.

In some embodiments, the user computing device can determine the state of the user interface based at least in part on one or more features of the user interface. For example, the user computing device can analyze the user interface data to determine the one or more features of the one or more interface elements. The one or more features of the one or more interface elements can then be used to determine the appearance and/or functionality of the one or more interface elements respectively.

The one or more features of the one or more interface elements can include one or more text labels associated with the one or more interface elements (e.g., an interface element associated with a mapping application can be associated with a text label indicating a location), a visual appearance of the one or more interface elements (e.g., one or more colors, one or more shapes, and/or one or more patterns associated with the one or more interface elements), one or more sizes of the one or more interface elements (e.g., the size of the one or more interface elements relative to one another or in relation to the user interface), one or more locations of the one or more interface elements (e.g., the relative location of the one or more interface elements relative to one another; or the absolute location of the one or more interface elements in relation to the user interface), one or more input modalities of the one or more interface elements (e.g., the manner or way in which the one or more interface elements receive input including user input), and/or one or more output modalities of the one or more interface elements (e.g., the manner or way in which the one or more interface elements provide output including visual output and/or auditory output).

By way of example, the one or more input modalities can include tactile input modalities (e.g., a touch screen display or a button), visual input modalities (e.g., a camera), and/or auditory input modalities (e.g., a microphone). Further, the one or more output modalities can include tactile output modalities (e.g., haptic feedback generated by a vibration motor), visual output modalities (e.g., a display device), and/or auditory output modalities (e.g., a loudspeaker).

In some embodiments, determining the state of the user interface can be based at least in part on one more machine-learned models and the user interface data. The one or more machine-learned models can be configured and/or trained to classify the user interface, the user interface data, and/or the one or more interface elements into one or more classes (e.g., one or more semantic classes) respectively. For example, the one or more machine-learned models can be configured and/or trained to receive an input including the user interface and/or the user interface data and generate an output including one or more classes that are associated with the user interface. For example, the one or more machine-learned models can classify a user interface as being a particular type of application (e.g., an text messaging application), within a particular context (e.g., the compose text message screen), and a particular set of interface elements (e.g., send interface element, compose interface element, attachment interface element). As such, the state of the user interface can be associated with the one or more classes that are associated with the user interface. Further, the state of the user interface can be associated with a simplified user interface that satisfies one or more criteria with respect to the similarity of the one or more classes of the user interface and the one or more classes of the simplified user interface.

Furthermore, the one or more machine-learned models can be configured and/or trained using one or more supervised learning techniques and/or unsupervised learning techniques. Further, the one or more machine-learned models can be configured and/or trained using training data that includes one or more images of user interfaces, one or more images of user interface elements, and/or information associated with one or more attributes of the user interfaces or user interface elements. For example, the training data can include screen captures of user interfaces and/or user interface elements. Further, the user interface and/or the user interface elements can be tagged to identify one or more functionalities respectively. Based at least in part on input including the training data, the one or more machine-learned models can be configured and/or trained to recognize, detect, and/or identify one or more visual features of the images and thereby determine the state of the user interfaces depicted in the training data.

After being configured and/or trained, the one or more machine-learned models can receive input including the user interface data; perform one or more operations associated with the recognition, detection, and/or identification of one or more features of the user interface data; and generate an output including one or more semantic classes. The one or more semantic classes can be associated with one or more interface elements and/or one or more simplified user interface elements. For example, the one or more semantic classes can identify one or more functionalities of the one or more interface elements and can include information associated with one or more types of input that can be received by the one or more interface elements, one or more types of output that can be generated by the one or more interface elements, one or more applications that are associated with the one or more interface elements, and/or one or more types of information that are associated with the one or more interface elements. Furthermore, each of the one or more semantic classes can be associated with a set of the one or more simplified user interface elements, thereby facilitating mapping of the one or more interface elements to the one or more simplified user interface elements based on the one or more semantic classes that are the same in the one or more interface elements and the one or more simplified user interface elements.

In some embodiments, the one or more interface elements and/or the one or more simplified user interface elements are clustered into the one or more semantic classes based at least in part on one or more features of the one or more interface elements. For example, a clustering algorithm (e.g., k-means clustering or mean shift clustering) can be used to determine the clusters of previously recorded user interface states based on the one or more features of the respective user interface states.

The user computing device can map the user interface to a simplified user interface. Further, the user computing device can map the one or more interface elements to one or more simplified user interface elements. Mapping the one or more interface elements to the one or more simplified user interface elements can be based at least in part on the one or more functionalities of the one or more interface elements. For example, the one or more interface elements for the user interface of an e-mail application can be associated with a composition functionality to compose a new e-mail, a send functionality to send an e-mail, and a cancel functionality to close a currently active window with which a user is interacting. The user computing device can compare the one or more functionalities of the one or more interface elements of the e-mail application to one or more simplified user interface elements that perform similar (or the same) functions as the respective one or more interface elements. When an interface element is determined to correspond to a simplified user interface element, the interface element can be mapped to the simplified user interface element.

In some embodiments, mapping the user interface to the simplified user interface can include one or more comparisons of the user interface to one or more previously recorded user interfaces and/or one or more simplified user interfaces. The one or more previously recorded user interfaces can be based at least in part on analysis of one or more previously recorded user interfaces in which the state of each previously recorded user interface and the one or more functionalities associated with one or more interface elements of the one or more previously recorded user interfaces was stored.

The one or more previously recorded user interfaces and/or the one or more simplified user interfaces can be classified according to their respective one or more features. For example, one or more machine-learned models can be used to classify the one or more previously recorded user interfaces based on their respective one or more features. Further, one or more machine-learned models can be used to classify the one or more simplified user interfaces based on their respective features. Each of the one or more previously recorded user interfaces can then be mapped to a respective one of the one or more simplified user interfaces based at least in part on their similarity (e.g., membership in one or more common classes). Further, one or more machine-learned models can be used to classify the user interface. The user interface can then be compared to the one or more previously recorded user interfaces to determine the previously recorded user interface that is most similar (e.g., that has the most classes in common). The simplified user interface associated with the previously recorded user interface that is most similar to the user interface can then be mapped to the user interface.

In some embodiments, the user interface data can include a tree hierarchy and/or a node hierarchy that is associated with the one or more interface elements. For example, each of the one or more interface elements can be associated with a respective node in a node hierarchy. Further, the relative position of each node in the node hierarchy and/or the associated attributes of each node can be used to determine the state of the user interface.

In some embodiments, mapping the one or more interface elements to the one or more simplified user interface elements can include comparing the tree hierarchy or node hierarchy to one or more stored tree hierarchies (or one or more node hierarchies) associated with one or more stored interface elements. For example, the structure and/or attributes of a node hierarchy associated with the one or more interface elements can be compared to the structure and/or attributes associated with the one or more stored interface elements (e.g., a one or more interface elements that were previously recorded and whose respective structure and attributes were stored as one or more stored interface elements).

Further, mapping the one or more interface elements to the one or more simplified user interface elements can include determining whether one or more portions of the tree hierarchy or the node hierarchy match one or more portions of the one or more stored tree hierarchies or one or more node hierarchies. For example, similarities and/or differences between the node hierarchy for the one or more interface elements and the node hierarchy of the one or more stored interface elements can be determined based at least in part on the comparison of the tree hierarchy of the one or more interface elements to the tree hierarchy of the one or more stored interface elements. The one or more portions of the one or more user interface elements that match the one or more portions of the one or more stored interface elements can then be mapped to the one or more simplified user interface elements that are associated with the one or more stored interface elements.

In some embodiments, the tree hierarchy or node hierarchy can be associated with an application programming interface (API) that defines one or more attributes of the one or more interface elements. Further, the one or more attributes can include attributes associated with one or more attributes associated with labels on the one or more interface elements (e.g., text labels identifying an interface element), one or more attributes associated with accessibility markup on the one or more interface elements (e.g., accessibility markup associated with enhancing the ease of use (readability, text size, type of font, and/or contrast) of an interface element), a layout of the one or more interface elements (e.g., the relative position of the one or more interface elements within the user interface), attributes associated with one or more respective inputs of the one or more interface elements, attributes associated with one or more respective outputs of the one or more interface elements, and/or attributes associated with an appearance of the one or more interface elements.

In some embodiments, the one or more features can include the pixels displayed on a display device associated with the user interface, the class name of the current user interface views, the package name of the application that is operating in the foreground of the user interface, the accessibility hierarchy associated with the application associated with the user interface, and/or the user interface elements displayed on the user interface, the previous state of the user interface, the time of day, the currently signed in user, location of the computing device associated with the user interface.

Furthermore, one or more features of the one or more interface elements can be used in mapping the one or more interface elements to the one or more simplified user interface elements. The one or more features of the one or more interface elements can include the pixels of an interface element, dimensions and text labels of the interface element; the placement of an interface element on the user interface; the type associated with the interface element; the type of interactions an interface element can receive; accessibility information including a content description and geometric position within the node hierarchy associated with an interface element, a class name of the interface element, a time of day, a location, and/or other user interface specific information.

Mapping the one or more interface elements to the one or more simplified user interface elements can include using the one or more features, to determine a distance between the current state of the user interface and one or more recorded states of the user interface that are associated with the one or more features. The one or more interface elements can be mapped to the one or more simplified user interface elements based at least in part on the distance between the current state of the user interface and one or more recorded states of the user interface that are associated with the one or more features.

Mapping the one or more interface elements to the one or more simplified user interface elements can include determining one or more probabilities of each of the one or more interface elements receiving a user interaction. For example, the user interface data can include information associated with the frequency with which one or more interface elements received a user interaction (e.g., an interface element receiving input from a user) in the past. Further, the user interface data can include information associated with the context in which a previous user interaction occurred. The frequency with which each of the one or more interface elements in a particular context of the user interface were interacted with in the past can be used to determine one or more probabilities of the one or more interface elements receiving a user interaction in the present moment.

Further, mapping the one or more interface elements to the one or more simplified user interface elements can include mapping a predetermined number of the one or more simplified user interface elements to a respective number of the one or more interface elements that satisfy one or more criteria associated with the probability of receiving a user interaction. The one or more criteria can include a minimum threshold probability of an interface element receiving a user interaction and/or a minimum threshold ranking of the one or more interface elements (e.g., the top three interface elements with the top three highest probabilities of receiving a user interaction). For example, an interface element can be mapped to a simplified user interface element when or if the probability of the interface element receiving a user interaction exceeds a predetermined threshold (e.g., a probability of ninety (90) percent).

Mapping the one or more interface elements to the one or more simplified user interface elements can include mapping the one or more interface elements to the one or more simplified user interface elements based at least in part on one or more machine-learned models. The one or more machine-learned models can be configured and/or trained to determine one or more features of the one or more interface elements that match the one or more simplified user interface elements. For example, the one or more machine-learned models can receive input including the one or more functionalities of the one or more interface elements and/or the user interface data. Further, the one or more machine-learned models can generate an output including the one or more simplified user interface elements that can map to the one or more interface elements.

The mapping of the one or more interface elements to the one or more simplified user interface elements can include the use of one or more keys associated with a set of the one or more features of the one or more interface elements that are determined to correspond to one or more respective element maps that represent the state of a respective user interface. Maintaining the consistent appearance of the simplified user interface elements can include assigning each key in an element map to an element class. The element class can then be assigned to an interface element, and the interface elements belonging to the same class can be represented using the same interface element. For example, the "CANCEL" interface element that is used to cancel an operation may have a different appearance in different applications but may perform the similar operation of canceling the operation that was most recently initiated by a user. As such, the "CANCEL" interface elements of different applications can belong to the same class of interface element. As a result, the features of the "CANCEL" interface element from one application may be useful in generating a simplified user interface for another application that also has an interface element that belongs to the "CANCEL" class of interface elements.

Interface elements can be grouped into element classes by clustering them on the basis of the one or more features including the pixels of the element's representation; dimensions and text labels on the element; placement on the screen; type of element; type of acceptable interactions; accessibility information including content description and geometric position within the accessibility node hierarchy; and/or the class name of the element.

The user computing device can generate a simplified user interface. Further, the simplified user interface can be based at least in part on and/or include any of the one or more simplified user interface elements which can include any of the one or more simplified user interface elements that are mapped to the one or more interface elements. The one or more simplified user interface elements can be configured to perform one or more operations associated with the one or more functionalities, one or more operations, and/or one or more tasks of the one or more interface elements to which the one or more simplified user interface elements are mapped. In some embodiments, the simplified user interface can include one or more simplified user interface elements that were not mapped to the one or more interface elements (e.g., a simplified user interface element that initiates operation of an application that is different from the application associated with the user interface).

Generation of the simplified user interface can include classification of a user interface. Classification of the user interface can include determining whether a user interface would be enhanced by a simplified user interface. By determining how an application is navigated through different states of its user interface to complete a task, the one or more machine-learned models can determine one or more simplified user interfaces that simplify the user interface through the application experience.

Generation of the simplified user interface can include the prediction of the most probable or likely (e.g., more probable or likely than some threshold level of probability or likelihood) elements to be interacted with on the user interface. By predicting probable or likely elements, the one or more interface elements on the screen that would be most useful when converted into the one or more simplified user interface elements of the simplified user interface.

In some embodiments, the appearance (e.g., the iconography associated with a simplified user interface element) of the simplified user interface can remain consistent across different user interfaces. For example, the one or more simplified user interface elements can be consistent even if the associated interface element corresponding to the simplified user interface element is presented differently across one or more different states of a user interface. For example, the "CANCEL" button associated with a simplified user interface element may be consistently represented in the simplified user interface by the same icon, though it is represented differently in different applications or in different screens within the same application.

In some embodiments, generating the simplified user interface can be based at least in part on one more machine-learned models. The one or more machine-learned models can be configured and/or trained to generate the simplified user interface based at least in part on an input including the state of the user interface and/or the one or more simplified user interface elements. For example, based on an input including the state of the user interface and/or a mapping of the user interface, the one or more machine-learned models can determine a location, color scheme, and/or orientation of the one or more simplified user interface elements within the user interface.

Generation of the simplified user interface can include the use of one or more machine-learning models to scrape the user interface of an application to determine which of the one or more interface elements are task-directed interface elements and may use natural language output to summarize these task-directed interface elements into the simplified user interface. For example, the simplified user interface for a mapping application may generate synthetic voice descriptions of how far each location selected by a user is from the current location of the user.

By way of example, the simplified user interface can include one or more graphical representations that include a combination of text and imagery with which a user can interact in order to perform one or more operations associated with the one or more functionalities of the one or more interface elements that are mapped to the one or more simplified user interface elements of the simplified user interface.

The user computing device can determine one or more proposed simplified user interface elements for each of the one or more interface elements that do not match the one or more simplified user interface elements. For example, the user computing device can use one or more machine-learned models to determine the one or more proposed simplified user interface elements based at least in part on an input that includes the one or more interface elements that do not match the one or more simplified user interface elements.

The user computing device can generate a prompt that can include a request for a user to select at least one of the one or more proposed simplified user interface elements. For example, if the user computing device determines that there are three proposed simplified user interface elements, the user computing device can generate a prompt that states "A SIMPLIFIED USER INTERFACE HAS BEEN GENERATED FOR YOU, PLEASE SELECT THE USER INTERFACE ELEMENTS THAT YOU ARE LIKELY TO USE IN THE FUTURE." The user can then manually select (e.g., touch a portion of the user interface that displays the desired user interface element) the proposed simplified user interface element that the user believes would be useful in the future. The user computing device can also provide an option for the user to cancel the simplified user interface if the user determines that none of the three proposed simplified user interface elements are sufficiently valuable to the user.

Generating the simplified user interface can include determining, based at least in part on the user interface data, one or more locations of the one or more interface elements respectively. For example, the user computing device can determine the one or more locations within the user interface of each of the one or more interface elements. The one or more locations can include a set of coordinates indicating the respective position of each of the one or more interface elements.

Generating the simplified user interface can further include generating the simplified user interface based at least in part on the one or more locations of the one or more interface elements. In some embodiments, the simplified user interface can be generated in a portion of the user interface in which the fewest of the one or more interface elements are located. For example, if the user computing device determines that none of the one or more interface elements are located on the bottom edge of a user interface, the simplified user interface can be generated on the bottom edge of the user interface, thereby not obscuring the one or more interface elements.

Generating the simplified user interface can include determining, based at least in part on the user interface data, the one or more interface elements that should not be obstructed. For example, the user interface data can indicate that an interface element is required to exit or close an application. As such, the interface element that is required to exit or close the application should not be obstructed as doing so would prevent a user from exiting or closing the application.

Furthermore, generating the simplified user interface can include generating the simplified user interface in one or more portions of the user interface that do not include the one or more interface elements that should not be obstructed. For example, subsequent to determining that an interface element (e.g., an exit application interface element) is associated with exiting or closing an application, the user computing device can generate the simplified user interface in a portion of the user interface that does not include the exit application interface element.

In some embodiments, one or more indications can be generated in order to identify the one or more interface elements that are mapped to the one or more simplified user interface elements. In this way, the one or more interface elements that have been mapped to the one or more simplified user interface elements can be readily determined by a user.

The one or more indications can include one or more highlights of the one or more interface elements (e.g., the one or more interface elements mapped to the one or more simplified user interface elements are highlighted in a particular color), one or more color changes of the one or more interface elements (e.g., a particular color or colors are applied to the one or more interface elements that were mapped to the one or more simplified user interface elements), one or more changes to a brightness of the one or more interface elements (e.g., the one or more interface elements that are mapped to the one or more simplified user interface elements are dimmer or brighter), one or more markings on the one or more interface elements (e.g., a symbol or text is generated on or near the one or more interface elements that are mapped to the one or more simplified user interface elements), and/or one or more shapes around the one or more interface elements (e.g., a circle or rectangle is generated around the one or more interface elements that are mapped to the one or more simplified user interface elements).

The simplified user interface can be presented (e.g., displayed) in a separate region from the user interface. For example, the user interface can be displayed on one display device and the simplified user interface can be displayed on a different display device. By way of further example, the user interface can be displayed in one region of a display device and the simplified user interface can be displayed in a different region of the same display device. In some embodiments, the simplified user interface can be superimposed over a portion of the user interface. For example, the simplified user interface can be an opaque, transparent, or semi-transparent overlay that is superimposed over a portion of the user interface (e.g., superimposed along the top or bottom edge of a user interface).

The simplified user interface can be associated with control of an application. For example, the user interface can be used to receive user inputs that are used to control various operations of an application. Further, the one or more simplified user interface elements can include one or more predetermined application controls and/or a control to remove the simplified user interface. For example, the one or more simplified user interface elements can include predetermined application controls that can be used to control a set of the most recently used applications.

The application can include a text messaging application, an e-mail application, and/or a telephone application. Further, the one or more predetermined application controls can include one or more message templates (e.g., text message templates to send predetermined messages to predetermined users), one or more predetermined geographic locations (e.g., predetermined routes to frequently visited geographic locations), and/or one or more predetermined user contacts (e.g., frequently contacted users in a telephone application).

In some embodiments the simplified user interface can be associated with an input modality that is different from that of the user interface. For example, the input modality of an interface element of the user interface can be a visual and tactile input modality in which a user confirms a route in a mapping application by touching a visual interface element with their finger. The simplified user interface can be an audio input modality (e.g., voice input modality) in which a user interacts with the simplified user interface for the mapping application by saying "YES" to confirm a route that was generated.

Further, the input modality of the simplified user interface can include a touch input modality (e.g., a visible simplified user interface element that a user can interact with via a touch screen display), an audio input modality (e.g., a simplified user interface element that a user can interact with via a microphone), and/or a gesture input modality (e.g., a simplified user interface element that a user can interact with via a gesture that is captured by a camera and gesture recognition system that can capture an image of a gesture and provide input to the user interface).

In some embodiments the simplified user interface can be associated with an output modality that is different from that of the user interface. For example, the output modality of an interface element of the user interface can be a visual output modality in which the destination in a mapping application is visually represented in a map. The simplified user interface can include an audio output modality in which the destination is announced by the user computing device when the location is nearby.

In some embodiments, the simplified user interface can be associated with, presented on, and/or generated on a different device or system than the device or system that the user interface is associated with, presented on, and/or generated on. For example, if the user interface is generated on the user computing device (e.g., a laptop computing device), the simplified user interface can be associated with, presented on, and/or or generated on a system or device (e.g., a smartphone) that is different and/or separate from the user computing device.

By way of further example, the user interface can be presented on a display device (e.g., a user interface comprising an instruction to confirm a user input can be presented via the display device of a smartphone) and the simplified user interface can be presented via one or more audio output devices (e.g., an auditory instruction to confirm a user input can be presented via headphones and/or earbuds).

Further, the output modality of the simplified user interface can include a visual output modality (e.g., a graphical representation of the simplified user interface), an auditory output modality (e.g., an auditory description of interface elements of the simplified user interface), and/or a tactile output modality (e.g., a vibratory output to indicate the presence of a simplified user interface element).

In some embodiments, the simplified user interface may be used in fully manual, partly manual, and/or fully automated ways. In the fully-manual embodiment, a user can configure the one or more interface elements that are communicated via the simplified user interface for one or more one or more states of a user interface. In the partly-manual embodiment, a user can configure the one or more interface elements with assistance from an automated software agent, which can include the use of one or more machine-learned models. In the fully-automated embodiment, the automated software agent can be configured to automatically generate the simplified user interface for one or more states of a user interface that are predicted to require and/or benefit from simplification.

The disclosed technology can include a computing system and/or computing device (e.g., the user computing device) that is configured to perform various operations associated with the generation of user interfaces including simplified user interfaces. In some embodiments, the user computing system can be associated with various computing systems and/or devices that use, send, receive, and/or generate information and/or data associated with the generation of simplified user interfaces. Furthermore, the user computing system can process, generate, modify, and/or access (e.g., send and/or receive) data and/or information including data and/or information associated with user interfaces.

The user computing device can include specialized hardware and/or software that enable the performance of one or more operations specific to the disclosed technology. The user computing system can include one or more application specific integrated circuits that are configured to perform operations associated with mapping user interface elements to simplified user interface elements and generating a simplified user interface.

The systems, methods, devices, apparatuses, and tangible non-transitory computer-readable media in the disclosed technology can provide a variety of technical effects and benefits including an improvement in the generation of user interfaces. In particular, the disclosed technology may assist a user (e.g. the user of a user computing device) in performing a technical task by means of a continued and/or guided human-machine interaction process in which a simplified user interface is provided to a user, based in part on the state of an existing user interface. Furthermore, the disclosed technology may also provide benefits including improvements in device ergonomics, better resource usage efficiency, and improved safety.

The systems, methods, devices, and computer program products (e.g., non-transitory computer-readable media) in the disclosed technology can provide a variety of technical effects and benefits to the overall ergonomics and ease of use for a user interacting with a user interface. For example, the disclosed technology has the effect that a simplified user interface that accepts more ergonomic user interactions can be generated based on the current configuration of a user interface.

Furthermore, the disclosed technology provides a solution to the problem of excessive user interface complexity by generating a simplified user interface that reduces the complexity of user interaction in a manner that preserves the capabilities of the user interface. Implementations of the disclosed technology can reduce the number, type, and complexity of burdensome interactions with default user interfaces. This reduction in burdensome interactions (e.g., a user needing to select small user interface elements or search through buried menus) can, aside from improving the ease of use of the user interface, also allow the user to engage the user interface more efficiently, thereby conserving computational and battery resources of the user computing device by minimizing the amount of user interaction with the user interface.

Additionally, the disclosed technology can improve user safety by providing a simplified user interface that may require fewer interactions by a user. For example, reducing the number of user interactions with a user interface can result in less diversion of user attention from a task that the user is engaged in. For example, a mapping application used by a pedestrian in a busy urban environment may use a simplified user interface that allows the user to have more time to remain aware of their surroundings while interacting with the simplified user interface of the mapping application.

Further, the disclosed technology can improve safety by generating a simplified user interface that has a different input modality or output modality from the initial user interface. For example, in a vehicle environment in which diverting the user's attention from the surrounding environment can reduce safety, a simplified user interface that accepts voice inputs (e.g., voice commands) may be created instead of, or in addition to, a user interface that requires the user to look at or touch a graphical user interface. As such, the user can interact with the simplified user interface in a manner that does not require the user to divert their attention from guiding the vehicle.

As such, the disclosed technology may assist the user of a simplified user interface to more effectively perform a variety of tasks with the specific benefits of improved device ergonomics, reduced resource consumption, and improved safety. Further, any of the specific benefits provided to users can be used to improve the effectiveness of a wide variety of devices and services including any devices or services that rely on the use of a user interface. Accordingly, the improvements offered by the disclosed technology can result in tangible benefits to a variety of applications, devices, and/or systems including mechanical, electronic, and computing systems associated with the generation and use of user interfaces.

With reference now to the Figures, example embodiments of the present disclosure will be discussed in further detail.

FIG. 1A depicts a block diagram of an example computing system 100 that performs operations associated with the generation of a simplified user interface according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the one or more machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example one or more machine-learned models 120 are discussed with reference to FIGS. 1A-15.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel operations to generate a simplified user interface across multiple instances of a user interface implemented on multiple respective computing devices).

More particularly, the one or more machine-learned models 120 can be configured and/or trained to determine one or more states of a user interface; map one or more interface elements of the user interface to one or more simplified user interface elements of a simplified user interface; and/or generate a simplified user interface.

Additionally, or alternatively, one or more machine-learned models 140 can be included in or otherwise stored and implemented by the server computing system 130 that communicates with the user computing device 102 according to a client-server relationship. For example, the one or more machine-learned models 140 can be implemented by the server computing system 140 as a portion of a web service (e.g., a simplified user interface generation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-15.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, one or more images of user interfaces, one or more images of user interface elements, and/or information associated with one or more attributes of the user interfaces or user interface elements.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is of higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
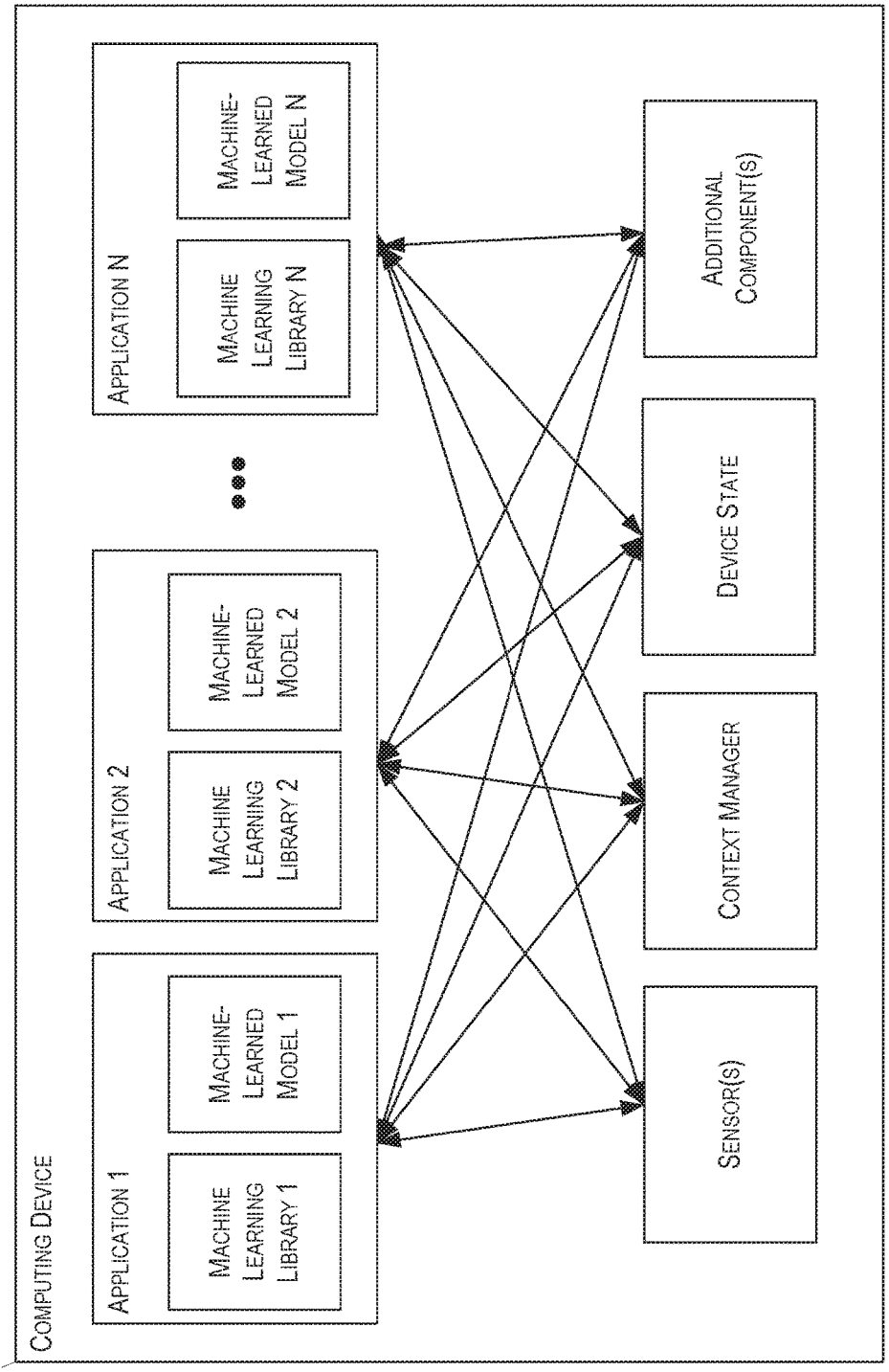
FIG. 1B depicts a block diagram of an example computing device that performs operations associated with the generation of a simplified user interface according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
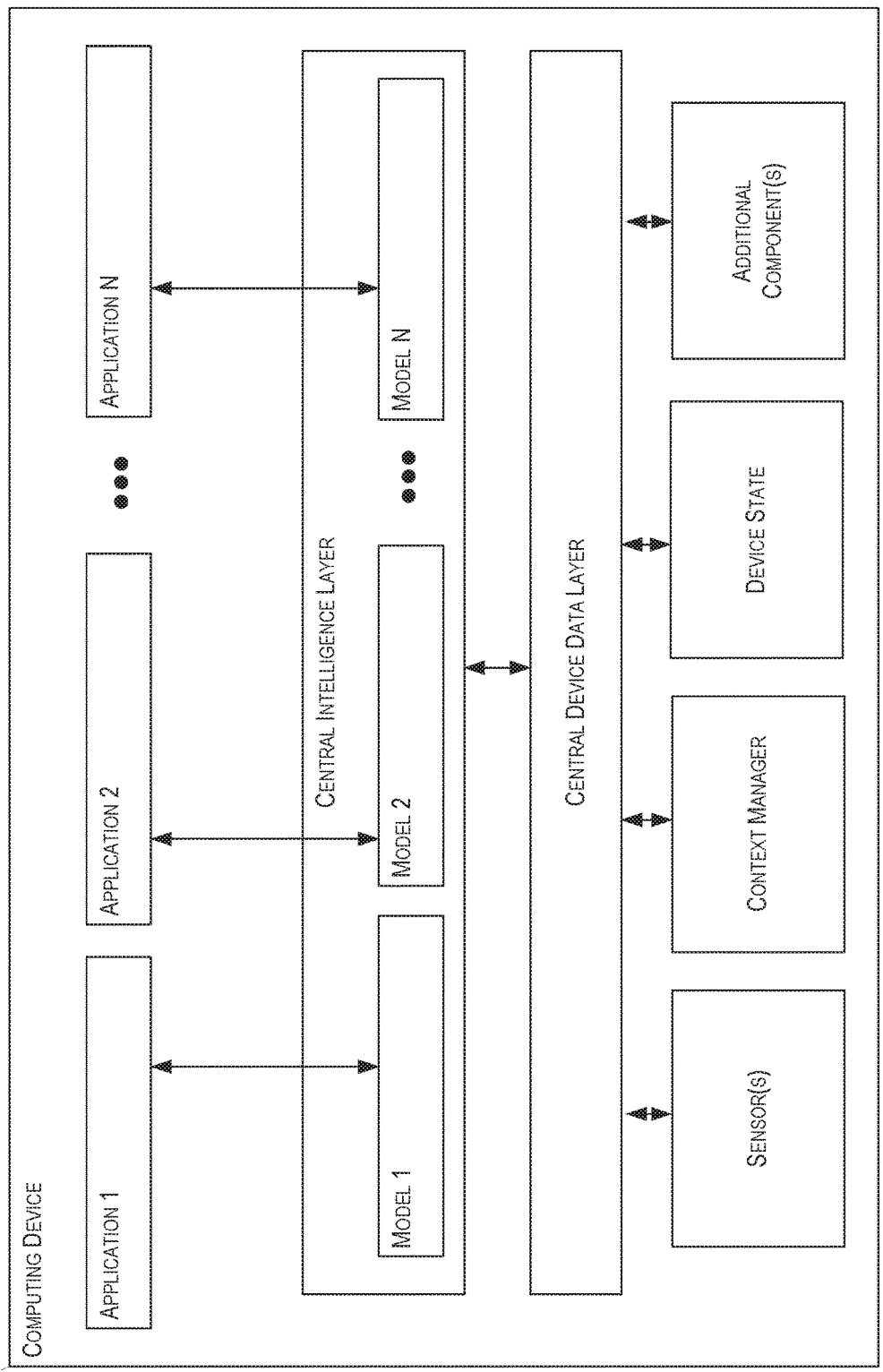
FIG. 1C depicts a block diagram of an example computing device that performs operations associated with the generation of a simplified user interface according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
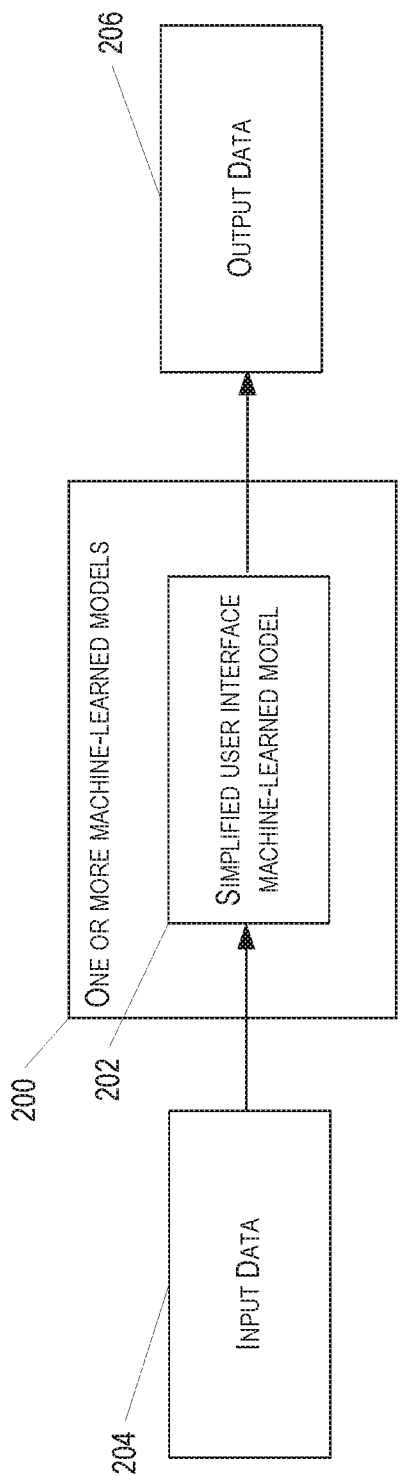
FIG. 2 depicts a block diagram of an example of one or more machine-learned models according to example embodiments of the present disclosure.

FIG. 2 depicts a block diagram of an example of one or more machine-learned models 200 according to example embodiments of the present disclosure. In some implementations, the one or more machine-learned models 200 are trained to receive a set of input data 204 descriptive of a user interface (e.g., the state of a user interface associated with the user interface data) and, after performing one or more operations on the input data 204, generating output data 206 that includes a simplified user interface. Thus, in some implementations, the one or more machine-learned models 200 can include a simplified user interface machine-learned model 202 that is operable to generate output associated with a simplified user interface.

Figure 3:
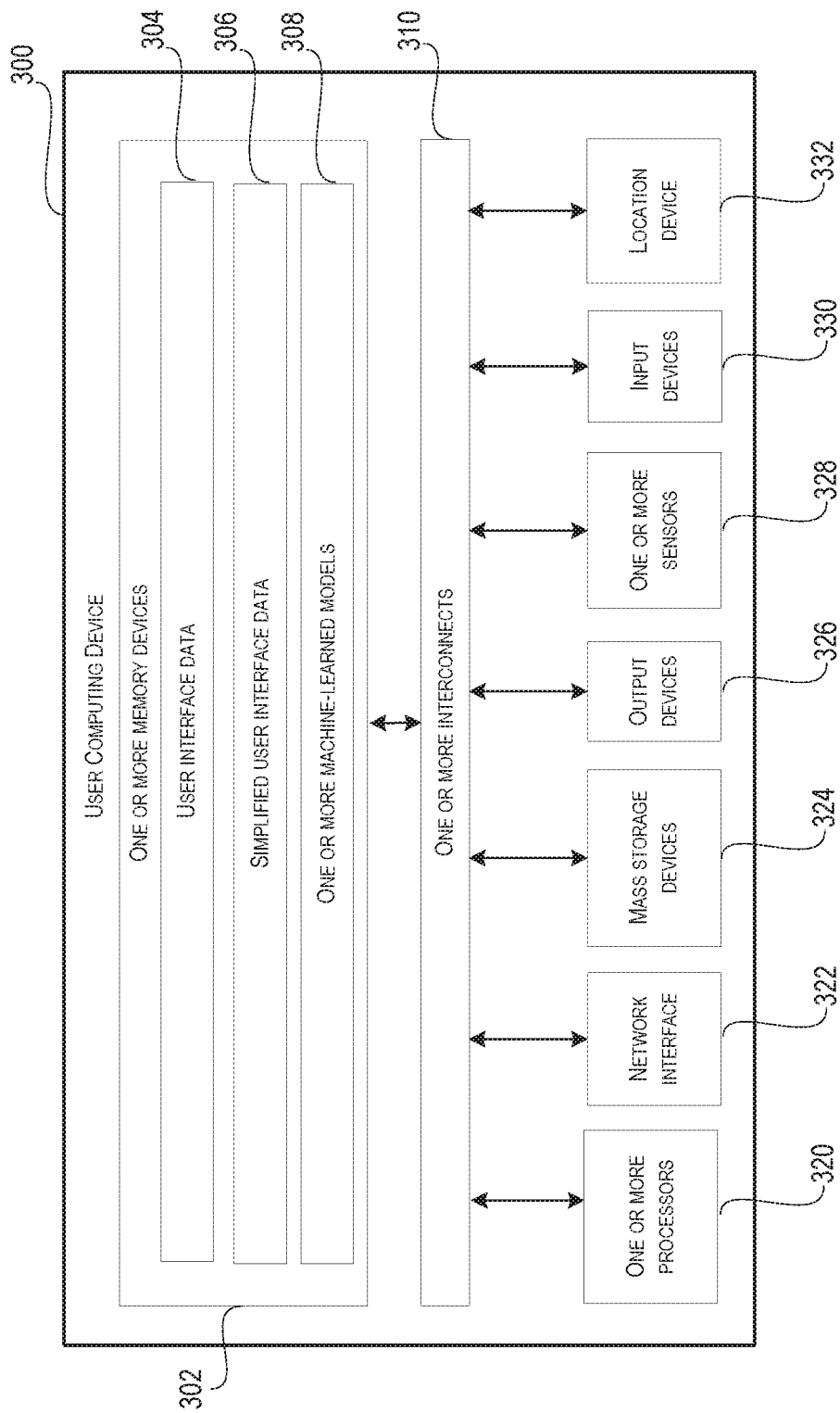
FIG. 3 depicts an example of a user computing device according to example embodiments of the present disclosure.

FIG. 3 depicts a diagram of an example user computing device according to example embodiments of the present disclosure. A user computing device 300 can include one or more attributes and/or capabilities of the computing device 102, the computing system 130, and/or the training computing system 150. Furthermore, the user computing device 300 can perform one or more actions and/or operations including the one or more actions and/or operations performed by the computing device 102, the computing system 130, and/or the training computing system 150, which are depicted in FIG. 1A.

As shown in FIG. 3, the user computing device 300 can include one or more memory devices 302, user interface data 304, simplified user interface data 306, one or more machine-learned models 308, one or more interconnects 310, one or more processors 320, a network interface 322, one or more mass storage devices 324, one or more output devices 326, one or more sensors 328, one or more input devices 330, and/or the location device 332.

The one or more memory devices 302 can store information and/or data (e.g., the user interface data 304, the simplified user interface data 306, and/or the one or more machine-learned models 308). Further, the one or more memory devices 302 can include one or more non-transitory computer-readable storage media, including RAM, ROM, EEPROM, EPROM, flash memory devices, magnetic disks, and combinations thereof. The information and/or data stored by the one or more memory devices 302 can be executed by the one or more processors 320 to cause the user computing device 300 to perform operations including operations associated with generating a user interface and/or a simplified user interface.

The user interface data 304 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154 respectively. Furthermore, the user interface data 304 can include information associated with one or more aspects of a user interface (e.g., one or more attributes of one or more user interface elements) that can be implemented on the user computing device 300. In some embodiments, the user interface data 304 can be received from one or more computing systems (e.g., the computing system 130 that is depicted in FIG. 1) which can include one or more computing systems that are remote (e.g., in another room, building, part of town, city, or nation) from the computing device 300.

The simplified user interface data 306 can include one or more portions of data (e.g., the data 116, the data 136, and/or the data 156, which are depicted in FIG. 1A) and/or instructions (e.g., the instructions 118, the instructions 138, and/or the instructions 158 which are depicted in FIG. 1A) that are stored in the memory 114, the memory 134, and/or the memory 154 respectively. Furthermore, the user interface data 306 can include information associated with one or more aspects of a simplified user interface (e.g., one or more attributes of one or more simplified user interface elements) that can be implemented on the user computing device 300. In some embodiments, the simplified user interface data 306 can be received from one or more computing systems (e.g., the computing system 130 that is depicted in FIG. 1) which can include one or more computing systems that are remote from the computing device 300.

The one or more machine-learned models 308 (e.g., the one or more machine-learned models 120 and/or the one or more machine-learned models 140) can include one or more portions of the data 116, the data 136, and/or the data 156 which are depicted in FIG. 1A and/or instructions (e.g., the instructions 118, the instructions 138, and/or the instructions 158 which are depicted in FIG. 1A) that are stored in the memory 114, the memory 134, and/or the memory 154 respectively. Furthermore, the one or more machine-learned models 308 can include information associated with determining the state of a user interface, mapping one or more interface elements to one or more simplified user interface elements, and/or generating a simplified user interface. In some embodiments, the one or more machine-learned models 308 can be received from one or more computing systems (e.g., the computing system 130 that is depicted in FIG. 1) which can include one or more computing systems that are remote from the computing device 300.

The one or more interconnects 310 can include one or more interconnects or buses that can be used to send and/or receive one or more signals (e.g., electronic signals) and/or data (e.g., the user interface data 304, the simplified user interface data 306, and/or the one or more machine-learned models 308) between components of the user computing device 300, including the one or more memory devices 302, the one or more processors 320, the network interface 322, the one or more mass storage devices 324, the one or more output devices 326, the one or more sensors 328 (e.g., a sensor array), and/or the one or more input devices 330. The one or more interconnects 310 can be arranged or configured in different ways including as parallel or serial connections. Further the one or more interconnects 310 can include one or more internal buses to connect the internal components of the user computing device 300; and one or more external buses used to connect the internal components of the user computing device 300 to one or more external devices. By way of example, the one or more interconnects 310 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt®, IEEE 1394 interface (FireWire®), and/or other interfaces that can be used to connect components.

The one or more processors 320 can include one or more computer processors that are configured to execute the one or more instructions stored in the one or more memory devices 302. For example, the one or more processors 320 can, for example, include one or more general purpose central processing units (CPUs), application specific integrated circuits (ASICs), and/or one or more graphics processing units (GPUs). Further, the one or more processors 320 can perform one or more actions and/or operations including one or more actions and/or operations associated with the user interface data 304, the simplified user interface data 306, and/or the one or more machine-learned models 308. The one or more processors 320 can include single or multiple core devices including a microprocessor, microcontroller, integrated circuit, and/or a logic device.

The network interface 322 can support network communications. For example, the network interface 322 can support communication via networks including a local area network and/or a wide area network (e.g., the Internet). The one or more mass storage devices 324 (e.g., a hard disk drive and/or a solid state drive) can be used to store data including the location data 304, the image data 306, and/or the orientation data 308. The one or more output devices 326 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more input devices 330 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 302 and the one or more mass storage devices 324 are illustrated separately, however, the one or more memory devices 302 and the one or more mass storage devices 324 can be regions within the same memory module. The user computing device 300 can include one or more additional processors, memory devices, network interfaces, which may be provided separately or on the same chip or board. The one or more memory devices 302 and the one or more mass storage devices 324 can include one or more computer-readable media, including, but not limited to, non-transitory computer-readable media, RAM, ROM, hard drives, flash drives, and/or other memory devices.

The one or more memory devices 302 can store sets of instructions for applications including an operating system that can be associated with various software applications or data. For example, the one or more memory devices 302 can store sets of instructions for applications that include a user interface that can receive input and generate output. The one or more memory devices 302 can be used to operate various applications including a mobile operating system developed specifically for mobile devices. As such, the one or more memory devices 302 can store instructions that allow the software applications to access data including data associated with the generation of a user interface and/or a simplified user interface. In other embodiments, the one or more memory devices 302 can be used to operate or execute a general-purpose operating system that operates on both mobile and stationary devices, including for example, smartphones, laptop computing devices, tablet computing devices, and/or desktop computers.

The software applications that can be operated or executed by the user computing device 300 can include applications associated with the system 100 shown in FIG. 1A. Further, the software applications that can be operated and/or executed by the user computing device 300 can include native applications and/or web-based applications.

The location device 332 can include one or more devices or circuitry for determining the position of the user computing device 300. For example, the location device 332 can determine an actual and/or relative position of the user computing device 300 by using a satellite navigation positioning system (e.g. a GPS system, a satellite positioning system with trade name Galileo, a satellite positioning system with trade name GLObal Navigation satellite system (GLONASS), a satellite positioning system with trade name BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 4:
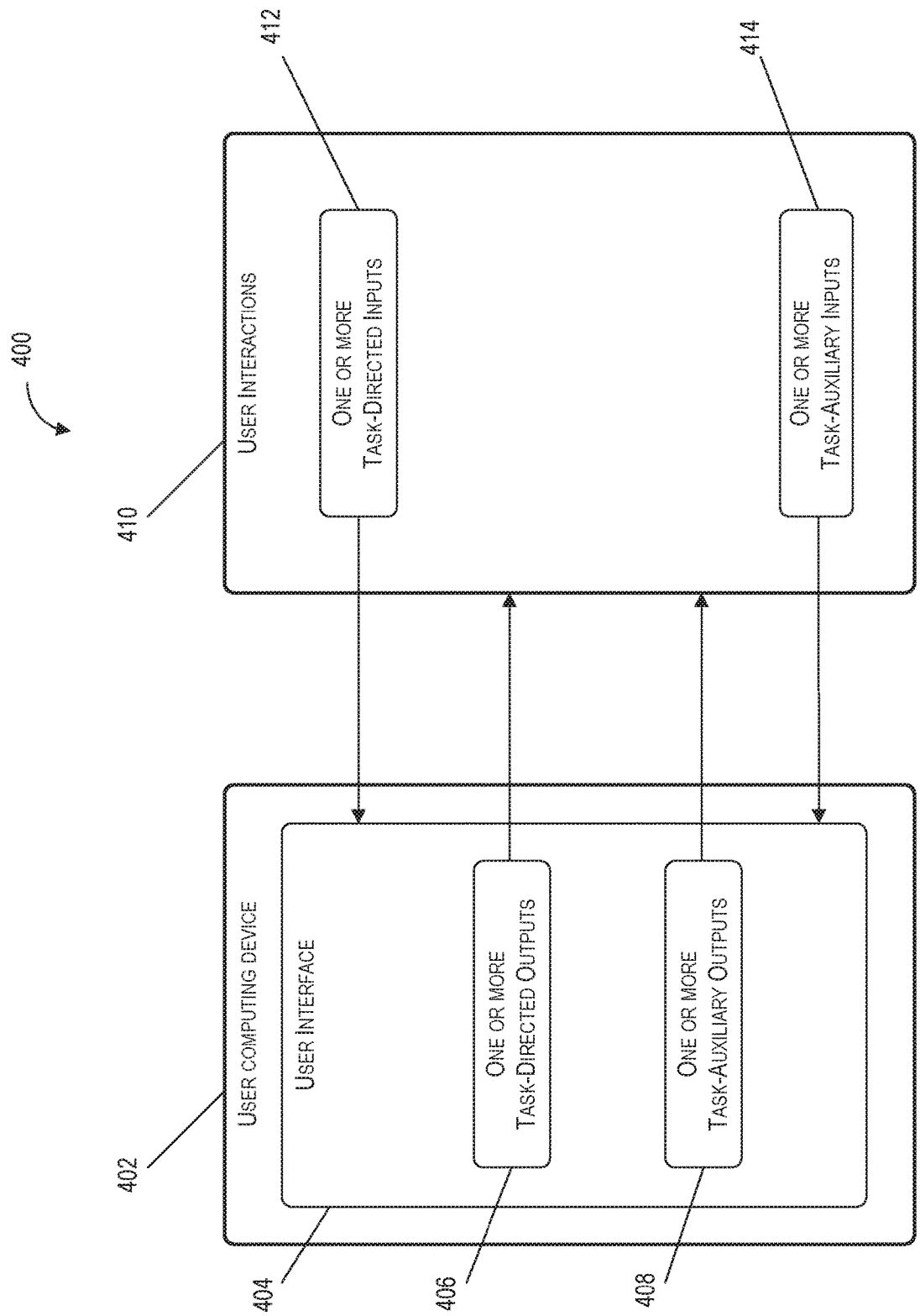
FIG. 4 depicts an example of user interaction with a user computing device according to example embodiments of the present disclosure.

FIG. 4 depicts an example of interactions between a user and a user interface implemented on a user computing device according to example embodiments of the present disclosure. A user computing device 402 can include one or more attributes and/or capabilities of the computing device 102, the computing system 130, the training computing system 150, and/or the user computing device 300. Furthermore, the user computing device 402 can perform one or more actions and/or operations including the one or more actions and/or operations performed by the computing device 102, the computing system 130, and/or the training computing system 150, and/or the user computing device 300.

As shown in FIG. 4, the environment 400 includes the user computing device 402, a user interface 404, one or more task-directed outputs 406, one or more task-auxiliary outputs 408, one or more user interactions 410, one or more task-directed inputs 412, and one or more task-auxiliary inputs 414.

A user can use a computing device (e.g., the user computing device 300 depicted in FIG. 3) to operate and/or control various applications. For example, a user can use a smartphone that can run an application, receive one or more inputs from the user, and generate one or more outputs that can be consumed by the user. The one or more inputs and/or one or more outputs can include one or more task-directed inputs 412 to the user computing device 402 and/or one or more task-directed outputs 406 from the user computing device 402, that may be associated with the user interactions 410 with the user interface 404 that directly result in the performance and/or completion of a task. The one or more inputs and/or one or more outputs can also include one or more task-auxiliary inputs 414 to the user computing device 402 and/or one or more task-auxiliary outputs 408 from the user computing device 402. The one or more task-auxiliary inputs 412 and/or one or more task-auxiliary outputs 408 can be associated with the user interactions 410 with the user interface 404 that may not necessarily be directly related to the performance and/or completion of a task. Further, the one or more task-auxiliary inputs 414 and/or the one or more task-auxiliary outputs 408 may assist a user in communicating and/or interacting with the user computing device 402 through the user interface 404.

For example, in a ride-hailing application that is implemented on the user computing device 402, the one or more task-directed inputs 412 can include the current location of the user computing device 402 and destination of a user associated with the user computing device 402 410 (e.g., a location to which the user of the user computing device 402 plans to travel), and the type of vehicle (e.g., a sedan, a compact car, and/or a van) that the user of the user computing device 402 requested. The one or more task-directed outputs 406 can include a confirmation message indicating that the requested vehicle is on its way, an estimated time of arrival of the vehicle ("ETA"), and the payment that will be required to pay the bill for the requested vehicle.

In some embodiments, in order to communicate the one or more task-directed inputs 412 to the user computing device 402, the user interface 404 may include one or more interface elements (not shown). For example, the user interface 404 can include a map interface element that can be used to assist a user in the selection of a source location and a destination location for a trip; one or more vehicle selection interface elements to assist the user in the selection of different types of vehicles; and/or various other interface elements that a user can use to confirm their selections.

In another example, one or more task-directed inputs 412 can include a user making a voice input (e.g., speaking to another user at the other end of the telephone connection); and task-directed outputs 406 including a user receiving voice output from the user at the other end of the telephone connection. Further, the one or more task-auxiliary inputs 414 can include a user controlling one or more interface elements (e.g., interface elements visually represented as buttons on the user interface 404) that allow the user to exit a telephone call, switch to speaker mode, and/or display the numeric keypad.

In some embodiments, one or more task-directed inputs 412 and/or the one or more task-directed outputs 406 can be transformed and/or simplified. The transformation and/or simplification of the one or more task-directed inputs 412 and/or the one or more task-directed outputs 406 can be conditional on no information being lost in the transformation or simplification. For example, when making a telephone call accessible to people who are hearing impaired, a simplification algorithm may caption the telephone call (since captions can be 1:1 mappable back to voice, thereby not losing textual information in the transformation). In contrast, the performance of other types of transformations and/or simplifications, for example, the summarization and/or simplification of language, may result in a task-level change in the application which may not represent the user's intention accurately.

Furthermore, the one or more task-auxiliary inputs 414 and/or the one or more task-auxiliary outputs 408 may be related to the modalities (e.g., input modalities and/or output modalities) that are available on the user computing device 402 and that encode implicit assumptions about the user's capabilities and the device's capabilities. In some embodiments, the one or more task-auxiliary inputs 414 and/or the one or more task-auxiliary outputs 408 can be changed in significant ways if needed, without affecting the task that is being implemented on the application. For example, if the user computing device 402 is a smartphone that relies on a display screen as the primary output and touch as the primary input, the user computing device 402 may offer a user interface that primarily relies on buttons and edit text boxes for input, with labels that guide the user to use these input widgets. A simplification algorithm may be able to change the modality of the one or more task-auxiliary inputs 414 and the one or more task-auxiliary outputs 408. For example, in a telephone communication application, a simplification algorithm may hide several less-important interface elements and only show the one most relevant and/or frequently used interface elements (e.g. the hang-up call interface element).

Figure 5:
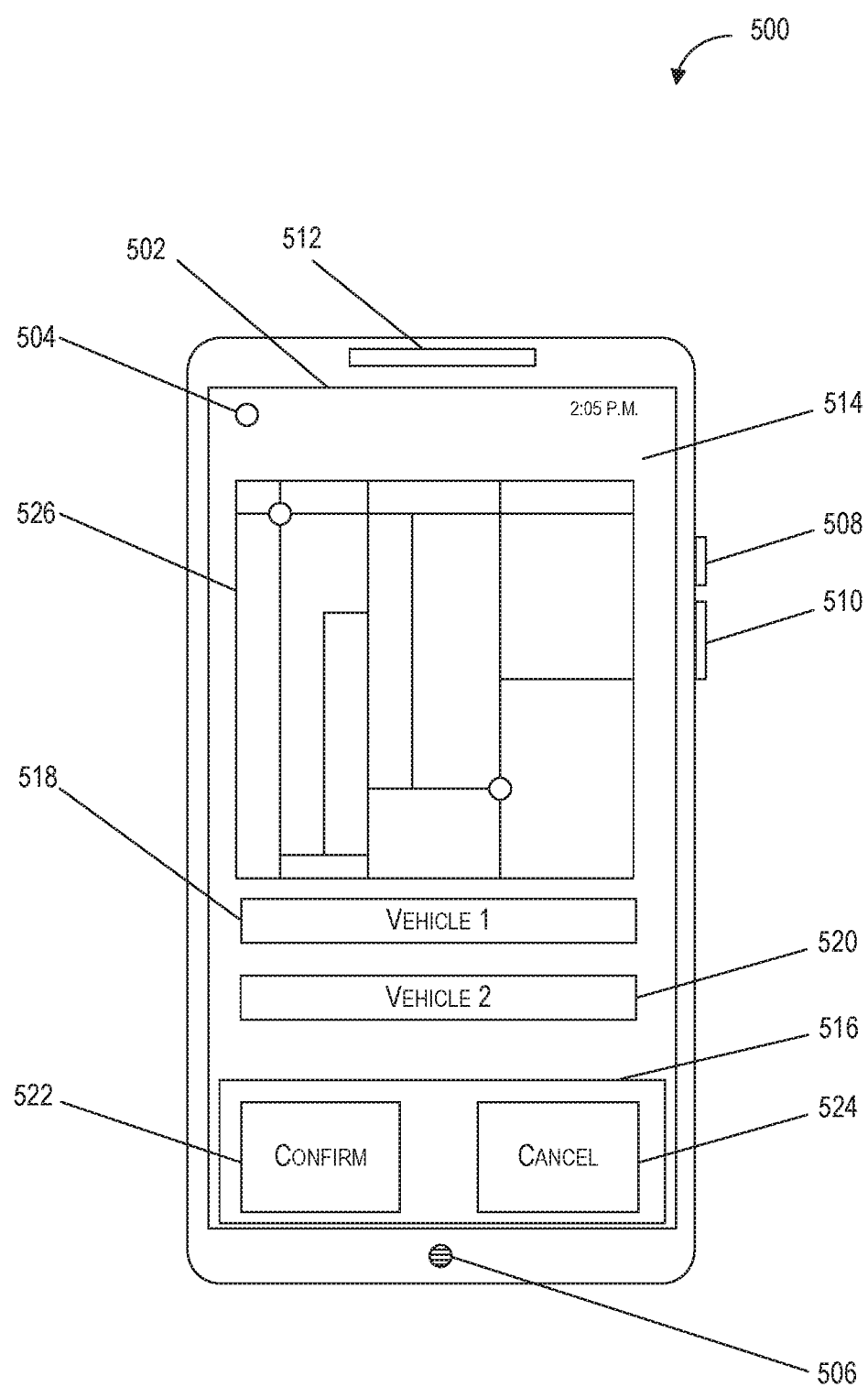
FIG. 5 depicts an example of a simplified user interface according to example embodiments of the present disclosure.

FIG. 5 depicts an example of a user interface implemented on a user computing device according to example embodiments of the present disclosure. A user computing device 500 can include one or more attributes and/or capabilities of the computing device 102, the computing system 130, the training computing system 150, and/or the computing device 300. Furthermore, the user computing device 500 can perform one or more actions and/or operations including the one or more actions and/or operations performed by the computing device 102, the computing system 130, the training computing system 150, and/or the computing device 300.

As shown in FIG. 5, the user computing device 500 includes a display component 502, an imaging component 504, an audio input component 506, a tactile component 508, a tactile component 510, an audio output component 512, a user interface 514, a simplified user interface 516, an interface element 518, an interface element 520, a simplified user interface element 522, and a simplified user interface element 524.

The user computing device 500 can be configured to receive one or more inputs including data (e.g., application data associated with a ride-share application implemented on the user computing device 500 and/or user interface data)

and/or one or more user interactions from a user of the computing device 500). Further, the user computing device 500 can be configured to generate the simplified user interface 516 that simplifies one or more inputs and/or one or more outputs of the user interface 514. The user interface 514 and/or the simplified user interface 516 can receive inputs and/or outputs via any of the display component 502, the imaging component 504, the audio input component 506, the tactile component 508, and/or the tactile component 510. Further, the user interface 514 and/or the simplified user interface 516 can generate outputs using any of the display component 502, the tactile component 508, the tactile component 510, and/or the audio output component 512.

The display component 502 can be configured to receive one or more inputs and/or generate one or more outputs associated with the user interface 514 and/or the simplified user interface 516. For example, the display component 502 can be configured to receive inputs to the user interface 514 including touch inputs associated with the selection of a vehicle for the user of the user computing device 500. Further, the display component 502 can be configured to generate one or more outputs including the simplified user interface 516, which can include a simplified version of the one or more interface elements of the user interface 514.

The imaging component 504 can include one or more cameras that can be configured to receive input including one or more images. The one or more images received by the imaging component 504 can be used in the generation of a simplified user interface 516 by receiving visual information (e.g., an image of a user gesture) that can be used as an alternative to another input modality (e.g., a user touching the display component 502). For example, a mapping application implemented on the user interface 514 can receive touch inputs to the display component 502 as the default input to confirm the selection of a vehicle. The simplified user interface 516 can use the imaging component 504 to receive visual inputs to indicate confirmation of the selection of a vehicle (e.g., an image of the user making the thumbs up gesture to confirm a selection).

The audio input component 506 can include one or more microphones that can be configured to receive sound inputs including speech from a user of the user computing device 500. The simplified user interface 516 generated on the user computing device 500 can include a simplification of visual interface elements (e.g., a text prompt to select a vehicle) by using the audio input component to receive auditory inputs to indicate confirmation of the selection of a vehicle (e.g., the user saying the words "vehicle confirmed" or just "confirmed").

The tactile components 508/510 can receive inputs including tactile inputs including touches and presses, and can in some embodiments, generate outputs including haptic feedback (e.g., vibratory feedback). The simplified user interface 516 generated on the user computing device 500 can include a simplification of visual interface elements (e.g., zooming into the map) by using the tactile components 508/510 to receive tactile inputs (e.g., pressing the tactile component 508) to indicate zooming into the map.

Furthermore, the user computing device 500 can be configured to generate outputs (e.g., visual outputs including the user interface 514 and/or the simplified user interface 516) that include the locations of vehicles that a user can select. The user computing device 500 can simplify the user interface 514 by generating the simplified user interface 516 that includes one or more outputs that have a different output modality from the output modality provided by the user interface 514. For example, the user interface 514 can include textual notifications when a vehicle selected by a user is ready to pick up the user. The simplified user interface 516 can use the audio output component 512 (e.g., one or more loudspeakers) to generate audible outputs including audible notifications (e.g., an announcement that "the vehicle is ready to pick you up") when a vehicle selected by a user is ready to pick up the user.

In this example, the user computing device 500 is implementing a ride-sharing application that displays a map of the geographic area within a two (2) kilometer radius around the user computing device 500. The user interface 514 generates the interface element 526 (e.g., a map interface element that renders an image of a geographic area); the interface element 518 which represents a first vehicle ("VEHICLE 1") that a user can select by touching (e.g., tapping) the interface element 518; and the interface element 520 which represents a second vehicle ("VEHICLE 2") that a user can select by touching the interface element 520. The user computing device 500 can determine the state of the user interface 514 (e.g., that the user interface 514 is associated with a rideshare application including the one or more interface elements 518/520) and can generate the simplified user interface 516.

The simplified user interface 516 can include the simplified user interface element 522 ("CONFIRM") that a user can use to confirm a selection within the user interface 514; and the simplified user interface element 524 ("CANCEL") that a user can use to cancel a selection within the user interface 514. For example, the application may default to the interface element 518 ("VEHICLE 1") and if the user would like to confirm selection of the interface element 518, the user can simply touch the simplified user interface element 522 to confirm their selection instead of potentially incorrectly tapping interface element 520 or possibly having to interact with an additional interface element to confirm their selection.

Figure 6:
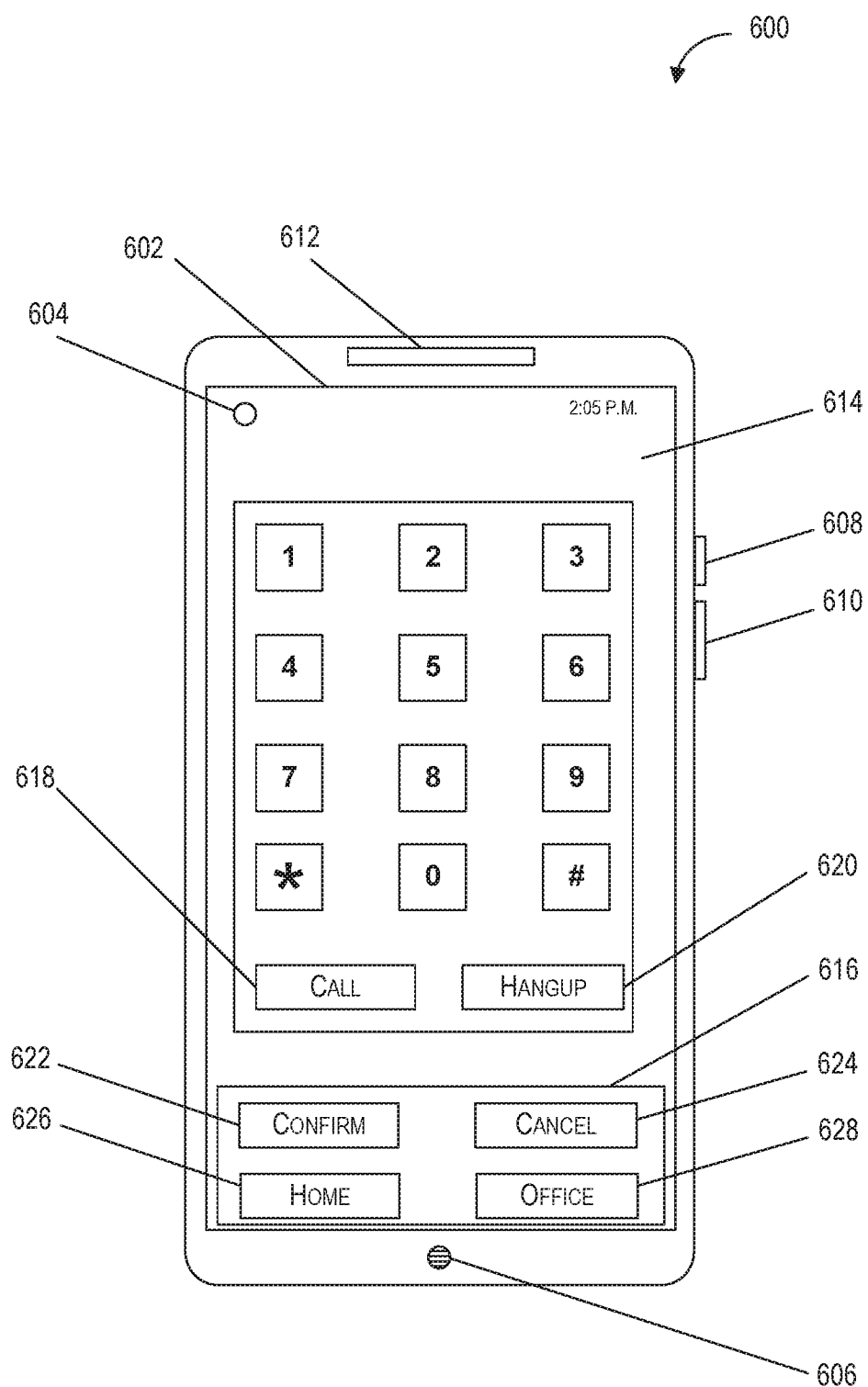
FIG. 6 depicts an example of a simplified user interface according to example embodiments of the present disclosure.

FIG. 6 depicts an example of a user interface implemented on a user computing device according to example embodiments of the present disclosure. A user computing device 600 can include one or more attributes and/or capabilities of the computing device 102, the computing system 130, the training computing system 150, and/or the user computing device 300. Furthermore, the user computing device 600 can perform one or more actions and/or operations including the one or more actions and/or operations performed by the computing device 102, the computing system 130, the training computing system 150, and/or the user computing device 300.

As shown in FIG. 6, the user computing device 600 includes a display component 602, an imaging component 604, an audio input component 606, a tactile component 608, a tactile component 610, an audio output component 612, a user interface 614, a simplified user interface 616, an interface element 618, an interface element 620, a simplified user interface element 622, a simplified user interface element 624, a simplified user interface element 626, and a simplified user interface element 628.

The user computing device 600 can be configured to receive one or more inputs including data (e.g., application data associated with communication application (a telephone and video-call application) implemented on the user computing device 600 and/or user interface data) and/or one or more user interactions from a user of the computing device 600). Further, the user computing device 600 can be configured to generate the simplified user interface 616 that simplifies one or more inputs and/or one or more outputs of the user interface 614. The user interface 614 and/or the simplified user interface 616 can receive inputs and/or outputs via any of the display component 602, the imaging component 604, the audio input component 606, the tactile component 608, and/or the tactile component 610. Further, the user interface 614 and/or the simplified user interface 616 can generate outputs using any of the display component 602, the tactile component 608, the tactile component 610, and/or the audio output component 612.

The display component 602 can be configured to receive one or more inputs and/or generate one or more outputs associated with the user interface 614 and/or the simplified user interface 616. For example, the display component 602 can be configured to receive inputs to the user interface 614 including touch inputs associated with the dialing a telephone number, calling a predetermined telephone number, and/or initiating a call. Further, the display component 602 can be configured to generate one or more outputs including the simplified user interface 616, which can include a simplified version of the one or more interface elements of the user interface 614.

The imaging component 604 can include one or more cameras that can be configured to receive input including one or more images. The one or more images received by the imaging component 604 can be used in the generation of the simplified user interface 616 by receiving visual information (e.g., an image of a user) that can be used as an alternative to another input modality (e.g., a user entering a passcode to access the communication application). For example, a communication application implemented on the user interface 614 can receive touch inputs to the display component 602 as the default input to enter a passcode to access the communication application and make calls. The simplified user interface 616 can use the imaging component 604 to receive visual inputs to confirm the identity of a user (e.g., an image of the user's face) through use of a facial recognition application implemented on the user computing device 600.

The audio input component 606 can include one or more microphones that can be configured to receive sound inputs including speech from a user of the user computing device 600. The simplified user interface 616 generated on the user computing device 600 can include a simplification of visual interface elements (e.g., the numeric keypad interface element) by using the audio input component to receive auditory inputs to that indicate a telephone number or contact that a user is attempting to call (e.g., the user speaking a telephone number or saying "call home").

The tactile components 608/610 can receive inputs including tactile inputs including touches and presses. The simplified user interface 616 generated on the user computing device 600 can include a simplification of visual interface elements (e.g., hanging up on a call) by using the tactile components 608/610 to receive tactile inputs (e.g., pressing the tactile component 608) to hang up on a call.

Furthermore, the user computing device 600 can be configured to generate outputs that include one or more auditory outputs associated with calls received by the communication application. The user computing device 600 can simplify the user interface 614 by generating the simplified user interface 616 that includes one or more outputs that have a different output modality from the output modality provided by the user interface 614. For example, the user interface 614 can include textual notifications a call was missed. The simplified user interface 616 can use the audio output component 612 (e.g., one or more loudspeakers) to generate audible outputs including audible notifications (e.g., "you missed a call from the office") when a vehicle associated with the missed call.

In this example, the user computing device 600 is implementing a communication application (e.g., a telephone application that can be used to make voice calls and/or video calls). The user interface 614 generates a numeric keypad, the interface element 618 which can be used to initiate a call; and the interface element 620 which can be used to end a call. The interface element 618 and the interface element 620 can be selected by a user touching (e.g., pressing) the interface element 618 and/or the interface element 620 respectively.

The user computing device 600 can use user interface data associated with the state of the user interface 614 to determine the state of the user interface 614. For example, the user computing device 600 can determine that the user interface 614 is associated with a communication application and can further determine one or more locations and/or one or more functionalities of the interface elements of the user interface 614 including the interface element 618 and the interface element 620.

Further, based on the state of the user interface 614 the user computing device 600 can generate the simplified user interface 616. The simplified user interface can be based at least in part on a user's previous interactions (e.g., calls made and calls received) with the user interface 614, which can be stored in user interface data and which can be used to configure and/or train one or more machine-learned models that can be used to determine the state of the user interface 614 and/or generate the simplified user interface 616. For example, the user computing device 600 can use the user's past interactions to determine the most frequently called telephone numbers and can then generate simplified user interface elements that are associated with those telephone numbers in order to facilitate a user's access to those telephone numbers.

The simplified user interface 616 can include the simplified user interface element 622 ("CONFIRM") that a user can use to confirm a selection within the user interface 614. For example, the simplified user interface element 622 can be used to confirm the addition of a third caller to a voice call (e.g., a three-way conference call). Further, the simplified user interface 616 can include the simplified user interface element 624 ("CANCEL") that a user can use to undo or cancel an operation and/or selection within the user interface 614. For example, a user can use the simplified user interface element 624 to undo a number that was incorrectly selected on the numeric keypad.

Furthermore, the simplified user interface 616 can include the simplified user interface element 626 ("HOME") that a user can use to make a call to a predetermined telephone number or personal contact that is associated with the simplified user interface element 626. For example, a user can use the simplified user interface element to call the home telephone number of their close relative. The simplified user interface 616 can further include the simplified user interface element 628 ("OFFICE") that a user can use to make a call to a predetermined telephone number or personal contact that is associated with the simplified user interface element 626. For example, a user can use the simplified user interface element 628 to call their office or business telephone number.

Figure 7:
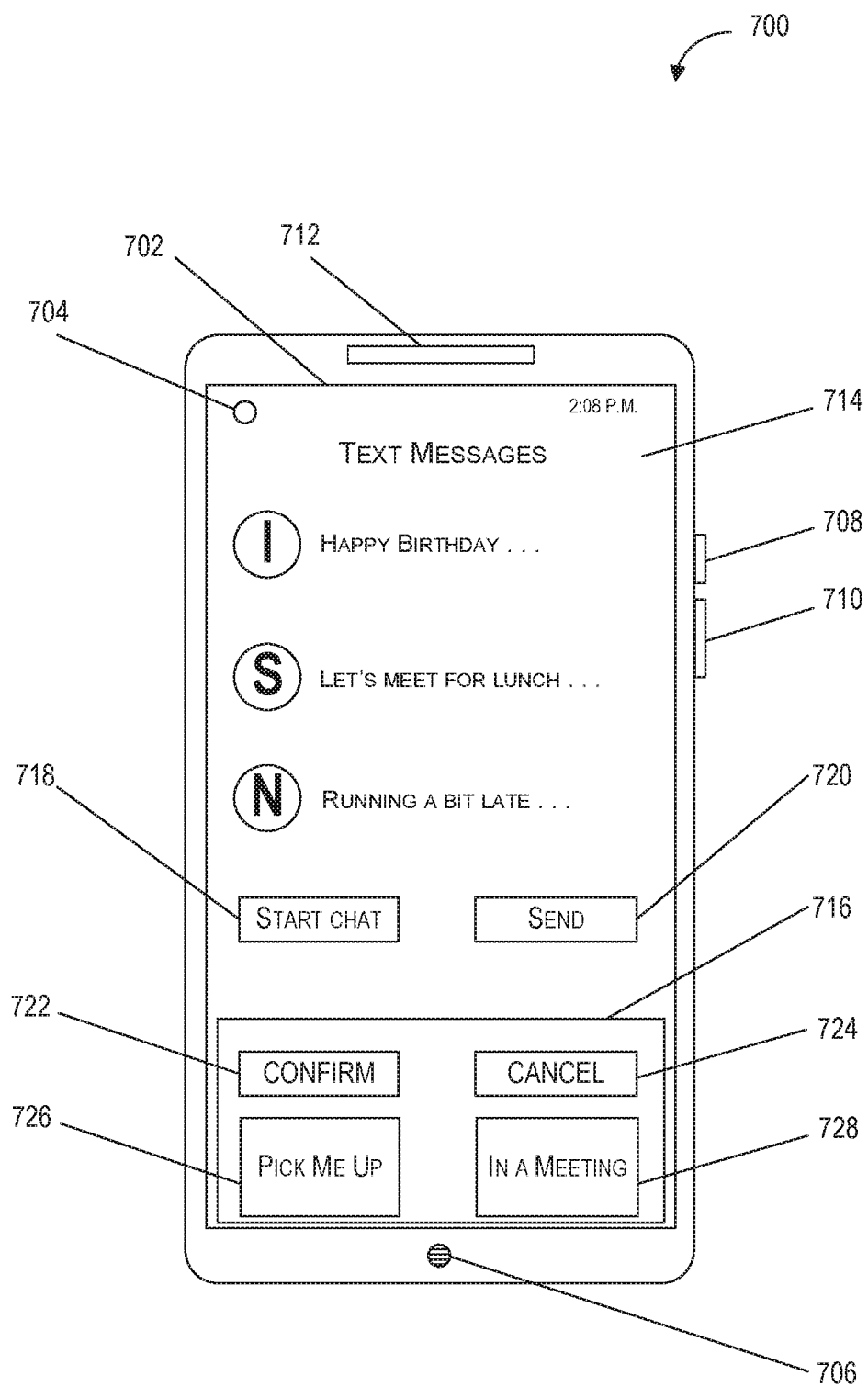
FIG. 7 depicts an example of a simplified user interface according to example embodiments of the present disclosure.

FIG. 7 depicts an example of a user interface implemented on a user computing device according to example embodiments of the present disclosure. A user computing device 700 can include one or more attributes and/or capabilities of the computing device 102, the computing system 130, the training computing system 150, and/or the user computing device 300. Furthermore, the user computing device 700 can perform one or more actions and/or operations including the one or more actions and/or operations performed by the computing device 102, the computing system 130, the training computing system 150, and/or the user computing device 300.

As shown in FIG. 7, the user computing device 700 includes a display component 702, an imaging component 704, an audio input component 706, a tactile component 708, a tactile component 710, an audio output component 712, a user interface 714, a simplified user interface 716, an interface element 718, an interface element 720, a simplified user interface element 722, a simplified user interface element 724, a simplified user interface element 726, and a simplified user interface element 728.

The user computing device 700 can be configured to receive one or more inputs including data (e.g., application data associated with a messaging application implemented on the user computing device 700 and/or user interface data) and/or one or more user interactions from a user of the computing device 700). Further, the user computing device 700 can be configured to generate the simplified user interface 716 that simplifies one or more inputs and/or one or more outputs of the user interface 714. The user interface 714 and/or the simplified user interface 716 can receive inputs and/or outputs via any of the display component 702, the imaging component 704, the audio input component 706, the tactile component 708, and/or the tactile component 710. Further, the user interface 714 and/or the simplified user interface 716 can generate outputs using any of the display component 702, the tactile component 708, the tactile component 710, and/or the audio output component 712.

The display component 702 can be configured to receive one or more inputs and/or generate one or more outputs associated with the user interface 714 and/or the simplified user interface 716. For example, the display component 702 can be configured to receive inputs to the user interface 714 including touch inputs associated with initiating a text message chat, sending a text message, and/or accessing a previously received text message. Further, the display component 702 can be configured to generate one or more outputs including the simplified user interface 716, which can include a simplified version of the one or more interface elements of the user interface 714.

The imaging component 704 can include one or more cameras that can be configured to receive input including one or more images. The one or more images received by the imaging component 704 can be used in the generation of the simplified user interface 716 by receiving visual information (e.g., an image of a user's eyes) that can be used as an alternative to another input modality (e.g., a user touching the display component 702). For example, a text messaging application implemented on the user interface 714 can receive touch inputs to the display component 702 as the default input to type "YES" or "NO" in response to a question. The simplified user interface 716 can use the imaging component 704 to receive visual inputs of a user's head and can use one or more image recognition techniques to determine that a head nodding gesture indicates "YES" and a head turning from one side to the other side and back indicates "NO" in response to a question.

The audio input component 706 can include one or more microphones that can be configured to receive sound inputs including speech from a user of the user computing device 700. The simplified user interface 716 generated on the user computing device 700 can include a simplification of visual interface elements (e.g., a pop-up on-screen keyboard that can be used to enter text) by using the audio input component to receive auditory inputs (e.g., voice dictation) of a text message that a user composes by speaking the text message aloud.

The tactile components 708/710 can receive inputs including tactile inputs including touches and presses. The simplified user interface 716 generated on the user computing device 700 can include a simplification of visual interface elements (e.g., touching the interface element 720 to send a text message) by using the tactile components 708/710 to receive tactile inputs (e.g., pressing the tactile component 708) to send a text message.

Furthermore, the user computing device 700 can be configured to generate outputs (e.g., visual outputs including the user interface 714 and/or the simplified user interface 716) that are associated with the text message application. The user computing device 700 can simplify the user interface 714 by generating the simplified user interface 716 that includes one or more outputs that have a different output modality from the output modality provided by the user interface 714. For example, the user interface 714 can generate visual outputs that display the contents of a text message on the display component 702. The simplified user interface 716 can use the audio output component 712 (e.g., one or more loudspeakers) to generate audible outputs that use a synthetic voice to read aloud the contents of a text message.

In this example, the user computing device 700 is implementing a messaging application (e.g., a text messaging application that can be used to communicate with one or more users). The user interface 714 includes the interface element 718 ("START CHAT") which can be used to initiate a text message; and the interface element 720 ("SEND") which can be used to send a text message. The interface element 718 and/or the interface element 720 can be respectively selected by a user touching (e.g., pressing) the interface element 718 or the interface element 720.

The user computing device 700 can determine the state of the user interface 714 and can generate the simplified user interface 716. Further, the user computing device 700 can use user interface data associated with the state of the user interface 714 to determine the state of the user interface 714. For example, the user computing device 700 can determine that the user interface 714 is associated with a messaging application and can further determine one or more locations and/or one or more functionalities (e.g., initiating a message and/or sending a message) of the interface elements of the user interface 714 including the interface element 718 and the interface element 720.

Further, based on the state of the user interface 714 the user computing device 700 can generate the simplified user interface 716. The simplified user interface can be based at least in part on a user's previous interactions with the user interface 714, which can be stored in user interface data and which can be used to configure and/or train one or more machine-learned models that can be used to determine the state of the user interface 714 and/or generate the simplified user interface 716. For example, the user computing device 700 can use the user's past interactions to determine the most frequently used user interactions (e.g., the contacts to which messages are most often sent and/or the replies that are most frequently sent) or operations (e.g., attaching an image to a text message) with the user interface 714 and can then generate simplified user interface elements that are associated with the user's most frequently used interactions or operations with the user interface 714.

The simplified user interface 716 can include the simplified user interface element 722 ("CONFIRM") that a user can use to confirm a selection within the user interface 714. For example, the simplified user interface element 722 can be used to confirm the addition of another contact (e.g., a contact to send a text message to) to the list of contacts for the messaging application. Further, the simplified user interface 716 can include the simplified user interface element 724 ("CANCEL") that a user can use to undo or cancel an operation and/or selection within the user interface 714. For example, a user can use the simplified user interface element 724 to undo a contact that was incorrectly added to the list of contacts for the messaging application. The simplified user interface 716 can include the simplified user interface element 726 ("PICK ME UP") that a user can use to send a text message to a predetermined contact, with the text message requesting that the predetermined contact pick the user up. For example, a user can use the simplified user interface element (e.g., by touching the simplified user interface element) to ask a predetermined relative or friend to pick the user up from a location that can be determined through use of a navigational component (not shown) of the user computing device 700. Further, the simplified user interface 716 can include the simplified user interface element 728 ("IN A MEETING") that a user can use (e.g., by touching the simplified user interface element) to send a message to the sender of the most recent text message that was received by the user. For example, during a meeting, a user can receive a message from a friend and can use the simplified user interface element 728 to let that person know that the message was received and that the user is currently in a meeting. In this manner, the simplified user interface 716 can facilitate the generation of a response to a text message that might otherwise involve many more time consuming interactions including manually typing a response.

Figure 8:
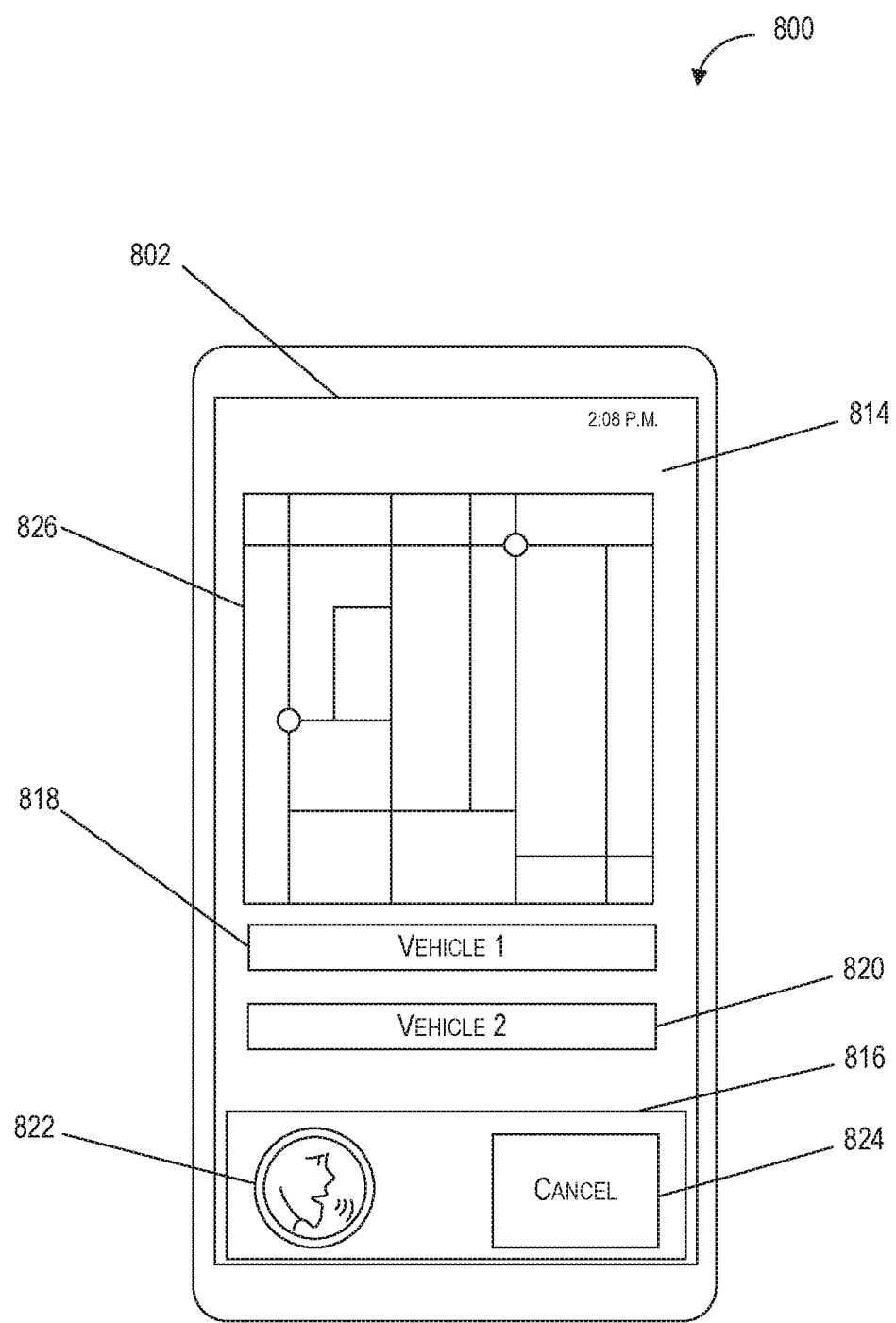
FIG. 8 depicts an example of a simplified user interface according to example embodiments of the present disclosure.

FIG. 8 depicts an example of a user interface implemented on a user computing device according to example embodiments of the present disclosure. A user computing device 800 can include one or more attributes and/or capabilities of the computing device 102, the computing system 130, the training computing system 150, the user computing device 300, and/or the user computing device 800. Furthermore, the user computing device 800 can perform one or more actions and/or operations including the one or more actions and/or operations performed by the computing device 102, the computing system 130, the training computing system 150, and/or the user computing device 300.

As shown in FIG. 8, the user computing device 800 includes a display component 802, a user interface 814, a simplified user interface 816, an interface element 818, an interface element 820, a simplified user interface element 822, a simplified user interface element 824, and an interface element 826.

In this example, the user computing device 800 is implementing a ride-sharing application. The user interface 814 generates the map interface element 826 that is associated with a map of the geographic area within a predetermined distance (e.g., three (3) kilometers) of the user computing device 800; the interface element 818 which represents a first vehicle ("VEHICLE 1") that a user can select by touching (e.g., pressing) the interface element 818; and the interface element 820 which represents a second vehicle ("VEHICLE 2") that a user can select by touching the interface element 820.

The user computing device 800 can determine the state of the user interface 814 and can generate the simplified user interface 816. Further, the user computing device 800 can use user interface data associated with the state of the user interface 814 to determine the state of the user interface 814. For example, the user computing device 800 can determine that the user interface 814 is the user interface of a ride-sharing application and can further determine one or more locations and/or one or more functionalities (e.g., displaying a map) of the interface elements of the user interface 814 including the interface element 818 and the interface element 820.

Further, based on the state of the user interface 814 the user computing device 800 can generate the simplified user interface 816. The simplified user interface can be based at least in part on a user's previous interactions with the user interface 814, which can be stored in user interface data and which can be used to configure and/or train one or more machine-learned models that can be used to determine the state of the user interface 814 and/or generate the simplified user interface 816. For example, the user computing device 800 can use the user's past interactions to determine the most frequently used user interactions or operations with the user interface 814 and can then generate simplified user interface elements that are associated with the user's most frequently used interactions or operations with the user interface 814. For example, the user computing device 800 can determine that the user frequently checks for vehicle pick-up notifications that indicate the appearance of the vehicle and when the vehicle will be ready to pick-up the user.

In some embodiments, the simplified user interface 816 can also include a summary of the one or more outputs associated with the user interface 814. For example, the user interface data associated with the state of the user interface 814 can include the expected time of arrival of the requested vehicle and/or the type of the vehicle. The simplified user interface 816 can include the simplified user interface element 822 which is associated with an output of the simplified user interface 816. Upon determining the state of the user interface 814, and that the vehicle that the user selected will shortly be ready to pick up the user, the user interface 814 can generate an audio output announcing, "YOUR VEHICLE, A RED SEDAN, WILL BE AT THE PICK-UP LOCATION IN 2 MINUTES." The user can cause the user computing device 800 to repeat the message by tapping the simplified user interface element 822. Further, the simplified user interface 816 can include the simplified user interface element 824 ("CANCEL") that a user can use to undo or cancel an operation and/or selection within the user interface 814. For example, a user can use the simplified user interface element 824 to cancel the request for a vehicle.

Figure 9:
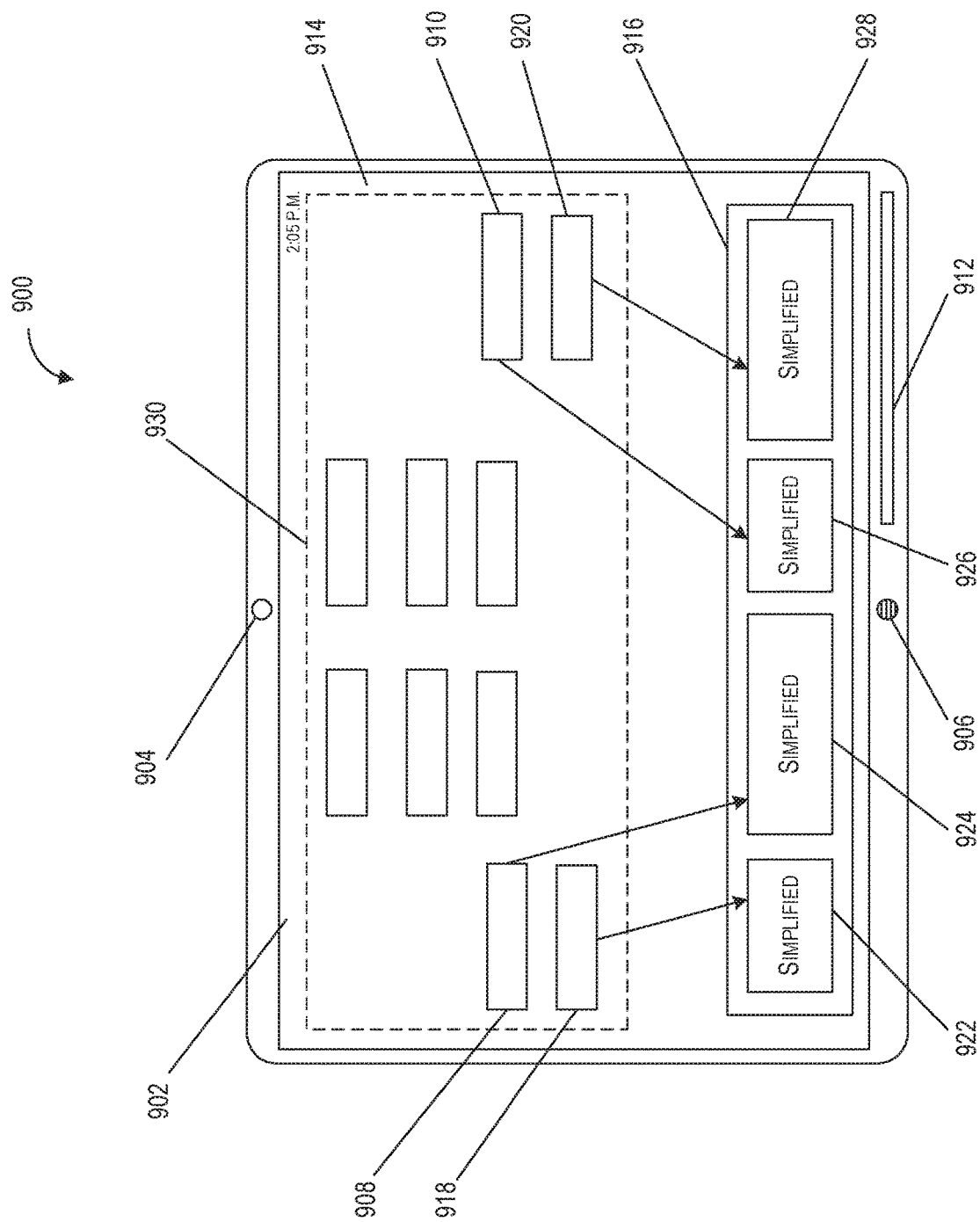
FIG. 9 depicts an example of a simplified user interface according to example embodiments of the present disclosure.

FIG. 9 depicts an example of a user interface implemented on a user computing device according to example embodiments of the present disclosure. A user computing device 900 can include one or more attributes and/or capabilities of the computing device 102, the computing system 130, the training computing system 150, and/or the user computing device 300. Furthermore, the user computing device 900 can perform one or more actions and/or operations including the one or more actions and/or operations performed by the computing device 102, the computing system 130, the training computing system 150, and/or the user computing device 300.

As shown in FIG. 9, the user computing device 900 includes a display component 902, an imaging component 904, an audio input component 906, a tactile component 908, a tactile component 910, an audio output component 912, a user interface 914, a simplified user interface 916, an interface element 918, an interface element 920, a simplified user interface element 922, a simplified user interface element 924, a simplified user interface element 926, a simplified user interface element 928, and a plurality of interface elements 930.

The user computing device 900 can be configured to receive inputs (e.g., information, data (e.g., application data and/or user interface data) and/or one or more user interactions). For example, the imaging component 904 can include one or more cameras that can be configured to receive input by capturing an image of an object that is placed in the field of view of the imaging component 904. The audio input component 906 can include one or more microphones that can be configured to receive one or more sound inputs including vocal statements associated with an input to the simplified user interface 916. Further, the display component 902 can be configured to receive inputs to the user interface 914 and/or the simplified user interface 916. For example, the display component 902 can be configured to receive inputs including touch inputs and other tactile interactions with the display component 902. Further, the display component 902 can be configured to receive inputs including touch inputs from one or more input devices (e.g., a mouse or a stylus).

Furthermore, the user computing device 900 can be configured to generate one or more outputs. For example, the audio output component 912 can include one or more loudspeakers and can be configured to generate audible outputs including synthetic vocalizations. Further, the display component 902 can be configured to display a visual representation of the user interface 914 and/or the simplified user interface 916.

The user interface 914 and/or the simplified user interface 916 can receive one or more inputs and/or generate one or more outputs. The user interface 914 and/or the simplified user interface 916 can receive inputs using any of the display component 902, the imaging component 904, the audio input component 906, the tactile component 908, and/or the tactile component 910. Further, the user interface 914 and/or the simplified user interface 916 can generate outputs using any of the display component 902, the tactile component 908, the tactile component 910, and/or the audio output component 912.

As shown, the user computing device 900 includes a display component 902 that is configured to display imagery (e.g., one or more images and/or text) including the user interface 912 and/or the simplified user interface 914, any combination of which can be associated with an application (e.g., an application that generates and/or uses the user interface 914 and/or the simplified user interface 916).

In this example, the user computing device 900 is implementing an interface configuration application that can be used to generate the simplified user interface 916. For example, a user can select an interface element of the plurality of interface elements 930 and associate the interface element with a simplified interface element in the simplified user interface element 916 by tapping the interface element and then tapping a simplified user interface elements in the simplified user interface element 916. For example, a user can select the interface element 918 (e.g., an interface element used to launch an e-mail application) and associate it with the simplified user interface element 922; select the interface element 908 (e.g., an interface element used to launch a voice dictation application) and associate it with the simplified user interface element 924; select the interface element 910 (e.g., an interface element used to toggle between using voice commands and using an onscreen keyboard to input text) and associate it with the simplified user interface element 926; and select the interface element 920 (e.g., an interface element used to project the contents of the user interface 914 to another device) and associate it with the simplified user interface element 928.

In some embodiments, the configuration of the simplified user interface 916 can be performed manually (e.g., a user selecting interface elements and mapping those interface elements to the simplified user interface), automatically (e.g., the computing device 900 can use one or more machine-learned models to generate the simplified user interface 916), or some combination of manual and automatic generation of the simplified user interface 916.

Figure 10:
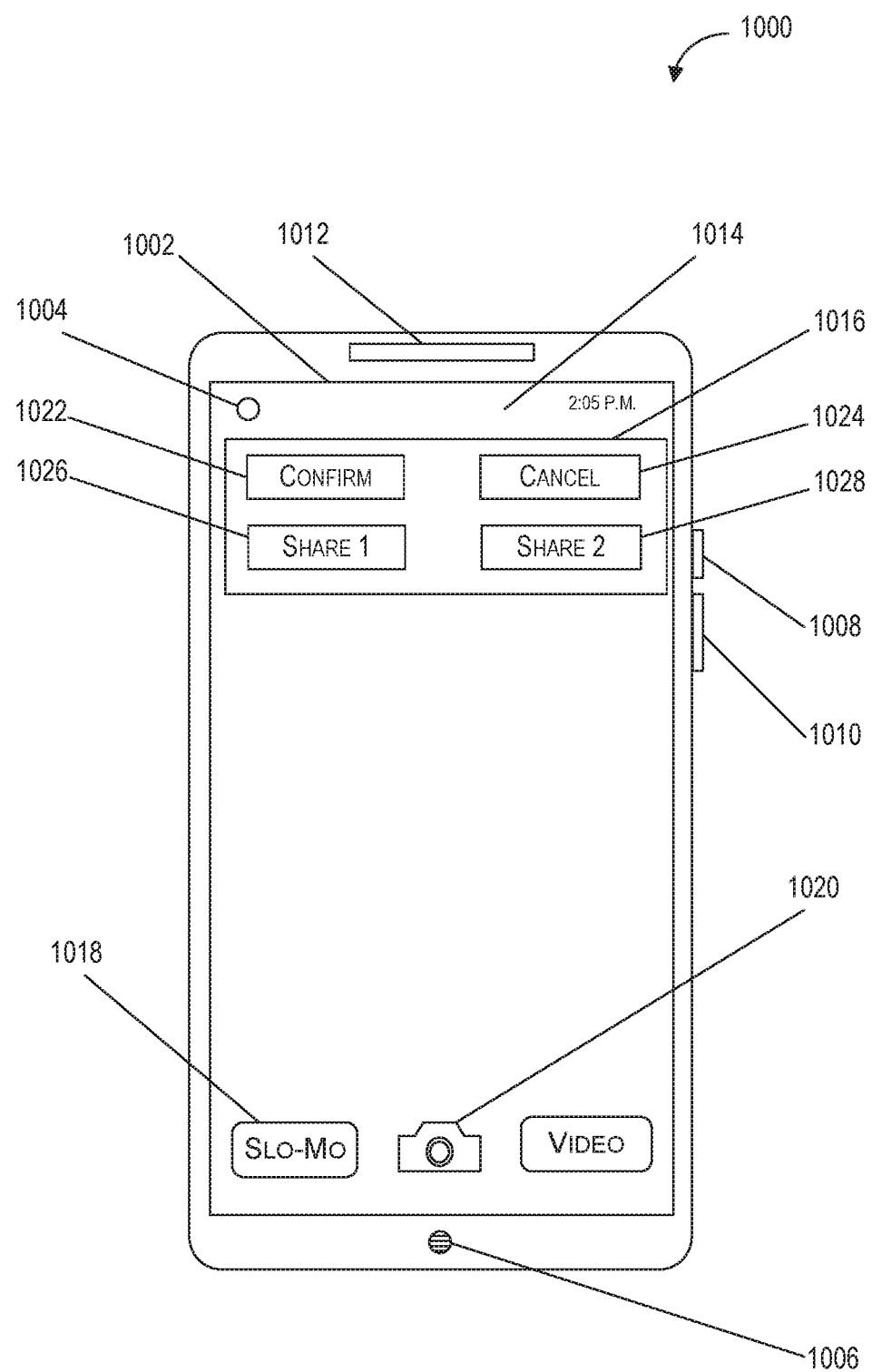
FIG. 10 depicts an example of a simplified user interface according to example embodiments of the present disclosure.

FIG. 10 depicts an example of a user interface implemented on a user computing device according to example embodiments of the present disclosure. A user computing device 1000 can include one or more attributes and/or capabilities of the computing device 102, the computing system 130, the training computing system 150, and/or the user computing device 300. Furthermore, the user computing device 1000 can perform one or more actions and/or operations including the one or more actions and/or operations performed by the computing device 102, the computing system 130, the training computing system 150, and/or the user computing device 300.

As shown in FIG. 10, the user computing device 1000 includes a display component 1002, an imaging component 1004, an audio input component 1006, a tactile component 1008, a tactile component 1010, an audio output component 1012, a user interface 1014, a simplified user interface 1016, an interface element 1018, an interface element 1020, a simplified user interface element 1022, a simplified user interface element 1024, a simplified user interface element 1026, and a simplified user interface element 1028.

The user computing device 1000 can be configured to receive one or more inputs including data (e.g., application data associated with a camera application implemented on the user computing device 1000 and/or user interface data) and/or one or more user interactions (e.g., the user performing an interaction to capture an image) from a user of the computing device 1000). Further, the user computing device 1000 can be configured to generate the simplified user interface 1016 that simplifies one or more inputs and/or one or more outputs of the user interface 1014. The user interface 1014 and/or the simplified user interface 1016 can receive inputs and/or outputs via any of the display component 1002, the imaging component 1004, the audio input component 1006, the tactile component 1008, and/or the tactile component 1010. Further, the user interface 1014 and/or the simplified user interface 1016 can generate outputs using any of the display component 1002, the tactile component 1008, the tactile component 1010, and/or the audio output component 1012.

The display component 1002 can be configured to receive one or more inputs and/or generate one or more outputs associated with the user interface 1014 and/or the simplified user interface 1016. For example, the display component 1002 can be configured to receive inputs to the user interface 1014 including touch inputs associated with capturing an image, capturing video, and/or recording slow-motion video. Further, the display component 1002 can be configured to generate one or more outputs including the simplified user interface 1016, which can include a simplified version of the user interface 1014.

The imaging component 1004 can include one or more cameras that can be configured to receive input including one or more images that are captured when the interface element 1020 is touched by a user. The one or more images received by the imaging component 1004 can be used in the generation of the simplified user interface 1016 by receiving visual information (e.g., an image of a user's eyes) that can be used as an alternative to another input modality (e.g., a user pressing any of the tactile components 1008/1010). For example, a camera application implemented on the user interface 1014 can receive touch inputs to the tactile component 1008 which can serve as a shutter control to capture an image. The simplified user interface 1016 can use the imaging component 1004 to receive visual inputs of a user's head and can use one or more image recognition techniques to determine that user's eyes have blinked twice in a predetermined time period in order to initiate capturing an image via the imaging component 1004.

The audio input component 1006 can include one or more microphones that can be configured to receive sound inputs including speech from a user of the user computing device 1000. The simplified user interface 1016 generated on the user computing device 1000 can include a simplification of visual interface elements (e.g., the interface element 1020 that is used to capture an image) by using the audio input component to receive auditory inputs (e.g., the user speaking the command "CAPTURE PHOTO") in order to initiate capturing an image by the imaging component 1004.

The tactile components 1008/1010 can receive inputs including tactile inputs including touches and presses. The simplified user interface 1016 generated on the user computing device 1000 can include a simplification of visual interface elements (e.g., touching an interface element to scroll through a set of images) by using the tactile components 1008/1010 to receive tactile inputs including pressing the tactile component 1008 to show the next image in a set of images; and pressing the tactile component 1010 to show the previous image in a set of images.

Furthermore, the user computing device 1000 can be configured to generate outputs (e.g., visual outputs including the user interface 1014 and/or the simplified user interface 1016) that are associated with the camera application. The user computing device 1000 can simplify the user interface 1014 by generating the simplified user interface 1016 that includes one or more outputs that have a different output modality from the output modality provided by the user interface 1014. For example, the user interface 1014 can generate visual outputs that display (e.g., display on the display component 1002) one or more previously captured images and can use one or more image recognition techniques to show the name of a user specified face if the face is present in the previously captured image that is being displayed. The simplified user interface 1016 can use one or more image recognition techniques and haptic feedback to generate a vibration when a particular face is present in an image that is being displayed.

In this example, the user computing device 1000 is implementing a camera application (e.g., an application that can be used to capture photographs and/or video via the imaging component 1004). The user interface 1014 includes the interface element 1018 ("SLO-MO") which can be used to capture slow motion video via the imaging component 1004; and the interface element 1020 that can be used to capture still images via the imaging component 1004. The interface element 1018 and/or the interface element 1020 can be respectively selected by a user touching (e.g., tapping) the interface element 1018 or the interface element 1020.

The user computing device 1000 can determine the state of the user interface 1014 and can generate the simplified user interface 1016. Further, the user computing device 1000 can use user interface data associated with the state of the user interface 1014 to determine the state of the user interface 1014. For example, the user computing device 1000 can determine that the user interface 1014 is the user interface of a camera application and can further determine one or more locations and/or one or more functionalities (e.g., capturing an image or recording a video) of the interface elements of the user interface 1014 including the interface element 1018 and the interface element 1020.

Further, based on the state of the user interface 1014, the user computing device 1000 can generate the simplified user interface 1016. The simplified user interface can be based at least in part on a user's previous interactions with the user interface 1014, which can be stored in user interface data and which can be used to configure and/or train one or more machine-learned models that can be used to determine the state of the user interface 1014 and/or generate the simplified user interface 1016. For example, the user computing device 1000 can use the user's past interactions (e.g., the camera modes that were used and/or the individuals with whom images were previously shared) to determine the most frequently used user interactions or operations with the user interface 1014 and can then generate simplified user interface elements that are associated with the user's most frequently used interactions or operations with the user interface 1014.

The simplified user interface 1016 can include the simplified user interface element 1022 ("CONFIRM") that a user can use to confirm an operation (e.g., saving or deleting an image) within the user interface 1014. For example, the simplified user interface element 1022 can be used to confirm an operation such as deleting an image that was captured. Further, the simplified user interface 1016 can include the simplified user interface element 1024 ("CANCEL") that a user can use to undo or cancel an operation and/or selection within the user interface 1014. For example, a user can use the simplified user interface element 1024 to undo the deletion of a recently deleted image. The simplified user interface element 1022 and the simplified user interface element 1024 can provide a consistent set of controls within the user interface 1014.

The simplified user interface 1016 can include the simplified user interface element 1026 ("SHARE 1") that a user can use to share an image that was captured with a predetermined contact by sending the image to the predetermined contact. For example, a user can use the simplified user interface element 1026 to send an image to a friend or relative. The simplified user interface 1016 can include the simplified user interface element 1028 ("SHARE 2") that a user can use to share an image that was captured with a predetermined contact by sending the image to the predetermined contact. For example, a user can use the simplified user interface element 1028 to send an image to a friend or relative that is different from the friend or relative that is associated with the simplified user interface element 1026.

Figure 11:
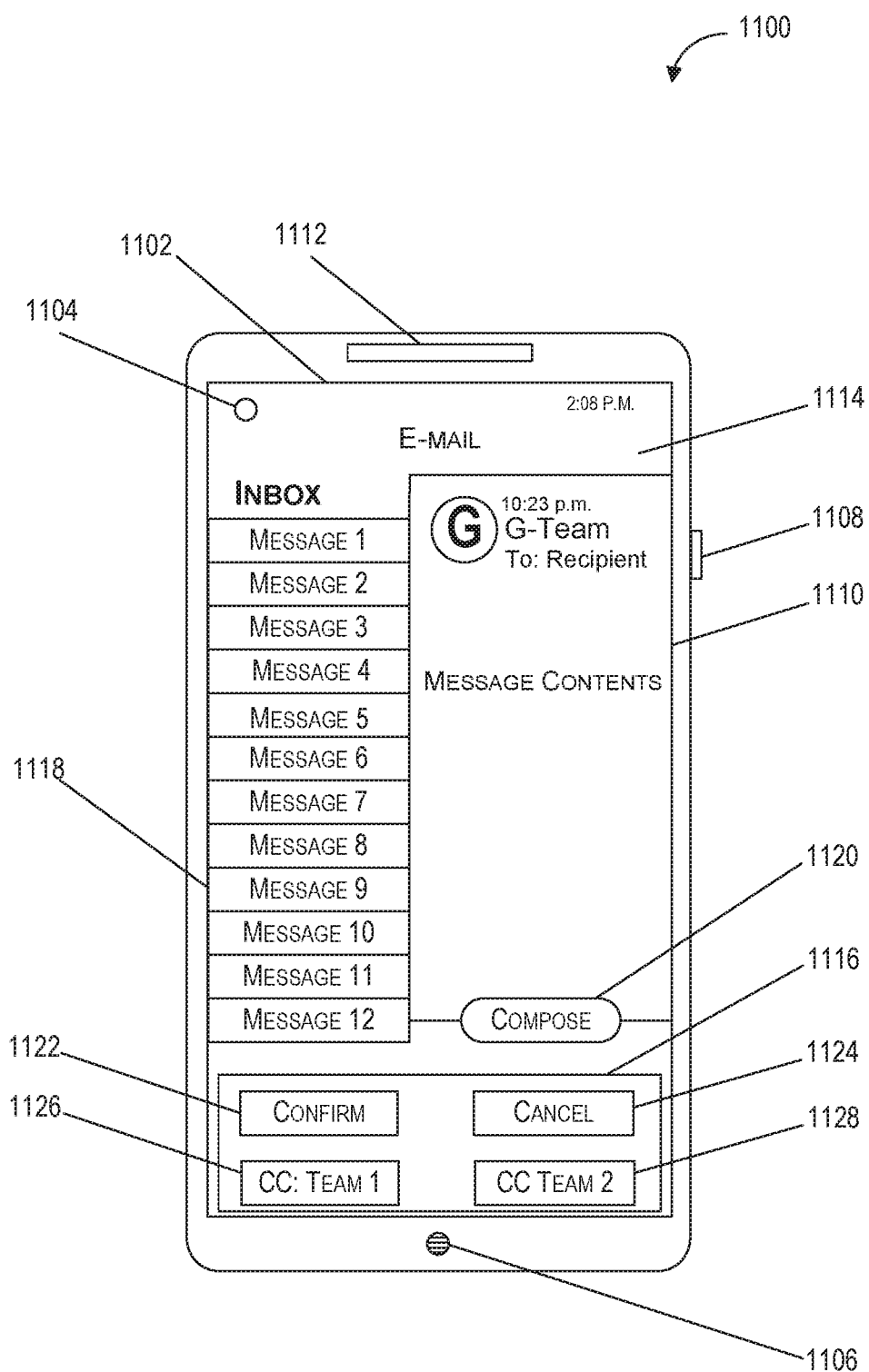
FIG. 11 depicts an example of a simplified user interface according to example embodiments of the present disclosure.

FIG. 11 depicts an example of a user interface implemented on a user computing device according to example embodiments of the present disclosure. A user computing device 1100 can include one or more attributes and/or capabilities of the computing device 102, the computing system 130, the training computing system 150, and/or the user computing device 300. Furthermore, the user computing device 1100 can perform one or more actions and/or operations including the one or more actions and/or operations performed by the computing device 102, the computing system 130, the training computing system 150, and/or the user computing device 300.

As shown in FIG. 11, the user computing device 1100 includes a display component 1102, an imaging component 1104, an audio input component 1106, a tactile component 1108, an audio output component 1112, a user interface 1114, a simplified user interface 1116, an interface element 1118, an interface element 1120, a simplified user interface element 1122, a simplified user interface element 1124, a simplified user interface element 1126, and a simplified user interface element 1128.

The user computing device 1100 can be configured to receive one or more inputs including data (e.g., application data associated with an e-mail application implemented on the user computing device 1100 and/or user interface data) and/or one or more user interactions from a user of the computing device 1100). Further, the user computing device 1100 can be configured to generate the simplified user interface 1116 that simplifies one or more inputs and/or one or more outputs of the user interface 1114. The user interface 1114 and/or the simplified user interface 1116 can receive inputs and/or outputs via any of the display component 1102, the imaging component 1104, the audio input component 1106, the tactile component 1108, and/or the tactile component 1110. Further, the user interface 1114 and/or the simplified user interface 1116 can generate outputs using any of the display component 1102, the tactile component 1108, the tactile component 1110, and/or the audio output component 1112.

The display component 1102 can be configured to receive one or more inputs and/or generate one or more outputs associated with the user interface 1114 and/or the simplified user interface 1116. For example, the display component 1102 can be configured to receive inputs to the user interface 1114 including touch inputs associated with composing an e-mail, sending an e-mail, and/or accessing a message in the inbox. Further, the display component 1102 can be configured to generate one or more outputs including the simplified user interface 1116, which can include a simplified version of the one or more interface elements of the user interface 1114.

The imaging component 1104 can include one or more cameras that can be configured to receive input including one or more images. The one or more images received by the imaging component 1104 can be used in the generation of the simplified user interface 1116 by receiving visual information (e.g., an of the user including a user's hand) that can be used as an alternative to another input modality (e.g., a user touching the display component 1102). For example, an e-mail application implemented on the user interface 1114 can receive touch inputs to the display component 1102 as the default input to advance to the next message in a list of messages in the e-mail inbox. The simplified user interface 1116 can use the imaging component 1104 to receive visual inputs of a user's hand and can use one or more image recognition techniques to determine that a hand waving from left to right will advance to the next message in the list of messages in the e-mail inbox.

The audio input component 1106 can include one or more microphones that can be configured to receive sound inputs including speech from a user of the user computing device 1100. The simplified user interface 1116 generated on the user computing device 1100 can include a simplification of visual interface elements (e.g., touching the display component 1104 to advance to the next message in a list of messages in the e-mail inbox) by using the audio input component to receive auditory inputs (e.g., a user saying "NEXT MESSAGE" aloud) to advance to the next message in a list of messages in the e-mail inbox.

The tactile components 1108/1110 can receive inputs including tactile inputs including touches and presses. The simplified user interface 1116 generated on the user computing device 1100 can include a simplification of visual interface elements (e.g., touching one of the plurality of interface elements 1118 to select an e-mail message and then pressing another interface element to delete the message) by using the tactile components 1108/1110 to delete a selected e-mail message.

Furthermore, the user computing device 1100 can be configured to generate outputs (e.g., visual outputs including the user interface 1114 and/or the simplified user interface 1116) that are associated with the e-mail application. The user computing device 1100 can simplify the user interface 1114 by generating the simplified user interface 1116 that includes one or more outputs that have a different output modality from the output modality provided by the user interface 1114. For example, the user interface 1114 can generate visual outputs that display the contents of an e-mail message on the display component 1102. The simplified user interface 1116 can use the audio output component 1112 (e.g., one or more loudspeakers) to generate audible outputs that use a synthetic voice to read aloud the contents of an e-mail message.

In this example, the user computing device 1100 is implementing an e-mail application. The user interface 1114 includes the plurality of interface elements 1118 which represent interface elements that a user can interact with to open a respective message (a user tapping "MESSAGE 1" will open the message associated with "MESSAGE 1") which can be displayed within the interface element 1110 ("MESSAGE CONTENTS"); and the interface element 1120 ("COMPOSE") that can be used to compose an e-mail message. The interface element 1118 and/or the interface element 1120 can be respectively selected by a user touching (e.g., tapping) the interface element 1118 or the interface element 1120.

The user computing device 1100 can determine the state of the user interface 1114 and can generate the simplified user interface 1116. Further, the user computing device 1100 can use user interface data associated with the state of the user interface 1114 to determine the state of the user interface 1114. For example, the user computing device 1100 can determine that the user interface 1114 is the user interface of an e-mail application and can further determine one or more locations and/or one or more functionalities (e.g., checking a message and/or composing a message) of the interface elements of the user interface 1114 including the interface element 1118 and the interface element 1120.

Further, based on the state of the user interface 1114 the user computing device 1100 can generate the simplified user interface 1116. The simplified user interface can be based at least in part on a user's previous interactions with the user interface 1114, which can be stored in user interface data and which can be used to configure and/or train one or more machine-learned models that can be used to determine the state of the user interface 1114 and/or generate the simplified user interface 1116. For example, the user computing device 1100 can use the user's past interactions to determine the most frequently used user interactions or operations with the user interface 1114 and can then generate simplified user interface elements that are associated with the user's most frequently used interactions or operations with the user interface 1114.

The simplified user interface 1116 can include the simplified user interface element 1122 ("CONFIRM") that a user can use to confirm a selection within the user interface 1114. For example, the simplified user interface element 1122 can be used to confirm the addition of another contact (e.g., a contact to send an e-mail message to) to the list of contacts for the e-mail application. Further, the simplified user interface 1116 can include the simplified user interface element 1124 ("CANCEL") that a user can use to undo or cancel an operation and/or selection within the user interface 1114. For example, a user can use the simplified user interface element 1124 to undo a contact that was incorrectly added to the list of contacts for the messaging application. The simplified user interface 1116 can include the simplified user interface element 1126 ("CC: TEAM 1") that a user can use to send an e-mail that the user composed to a predetermined group of e-mail recipients. For example, a user can use the simplified user interface element 1126 to send an e-mail to a specific group of individuals at the user's place of business. The simplified user interface 1116 can include the simplified user interface element 1128 ("CC: TEAM 2") that a user can use to send an e-mail that the user composed to a predetermined group of e-mail recipients. For example, a user can use the simplified user interface element 1128 to send an e-mail to a specific group of individuals at the user's place of business that is different from the group of individuals associated with the simplified user interface element 1126.

Figure 12:
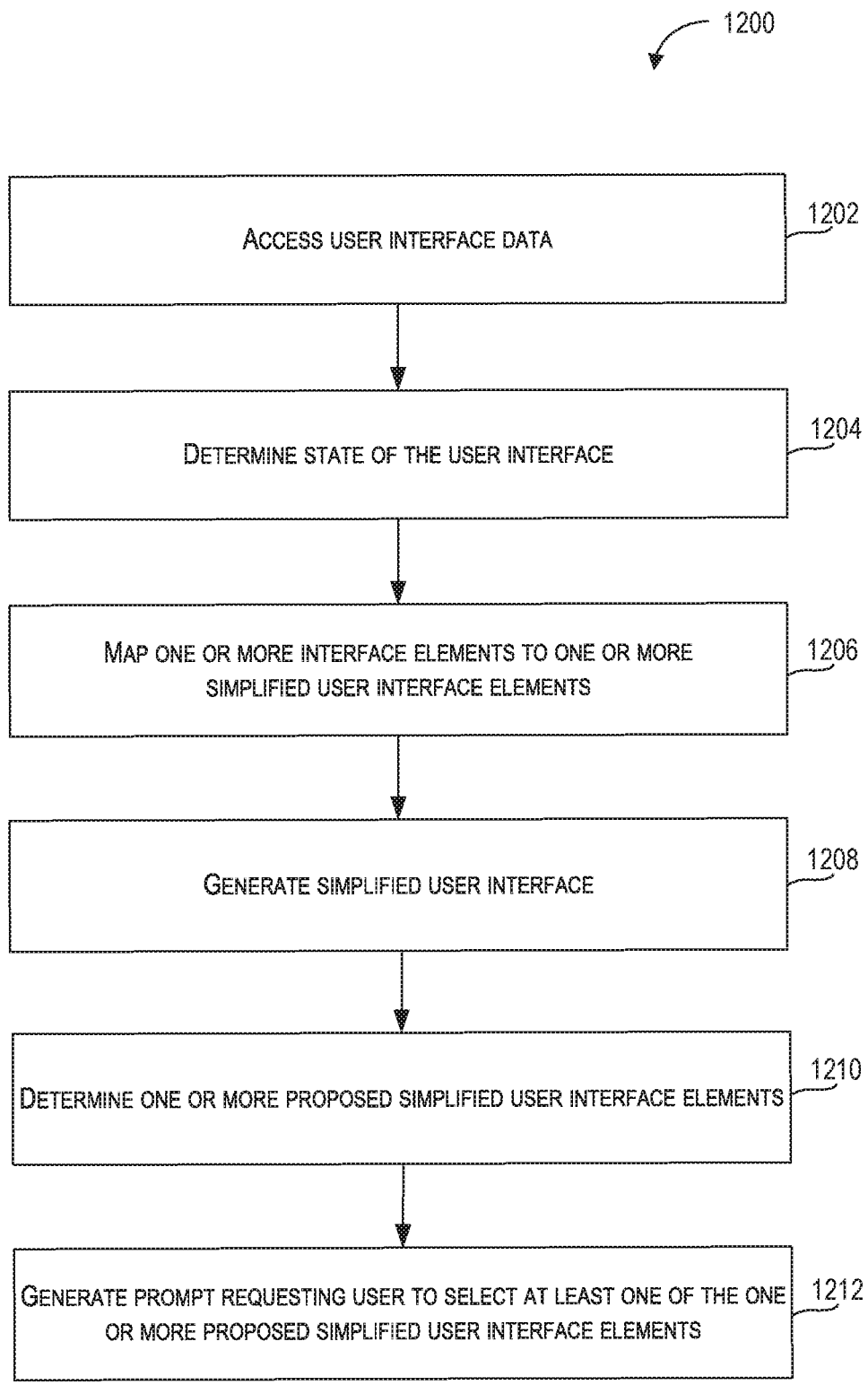
FIG. 12 depicts a flow diagram of simplified user interface generation according to example embodiments of the present disclosure.

FIG. 12 depicts a flow diagram of simplified user interface generation according to example embodiments of the present disclosure. One or more portions of the method 1200 can be executed and/or implemented on one or more computing devices or computing systems including, for example, the computing device 102, the computing system 130, the training computing system 150, and/or the user computing device 300. Further, one or more portions of the method 1200 can be executed or implemented as an algorithm on the hardware devices or systems disclosed herein. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include accessing data which can include user interface data. The user interface data can include one or more states of a user interface that includes one or more interface elements (e.g., interface elements that a user can interact with to perform one or more operations associated with an application). For example, the computing device 102 can be smartphone device that is configured to access user interface data that is associated with one or more applications (e.g., a mapping application) that are implemented on the computing device 102. The user interface data can be accessed locally on the smartphone device (e.g., user interface data stored on a memory device of the smartphone). In some embodiments, the user interface data can be at a remote location that is accessed by the smartphone (e.g., accessed via a wireless and/or wired network).

At 1204, the method 1200 can include determining a state of the user interface. The state of the user interface can be determined based at least in part on the user interface data. Further, the state of the user interface can include one or more functionalities of the one or more interface elements. For example, the computing device 102 can use the user interface data to determine the state of the user interface by performing one or more operations including determining one or more states and/or one or more functionalities of the user interface and/or the one or more interface elements. Determining the one or more functionalities of the user interface can include determining the one or more operations that the one or more interface elements and/or the user interface can perform, the one or more applications associated with the one or more interface elements and/or the user interface, and/or the one or more inputs and/or one or more outputs associated with the one or more interface elements.

Further, the computing device can determine one or more inputs and/or the one or more outputs that are associated with the user interface. For example, the computing device 102 can determine one or more interface elements of the user interface including: one or more input elements including controls that can activate, operate, and/or navigate applications and/or the user interface; and one or more output elements to provide output of the user interface including displaying images, producing sound, and/or producing haptic feedback. Further, the computing device 102 can determine one or more relationships between the one or more interface elements including the relative position of the one or more interface elements, and/or the ways in which the one or more interface elements can communicate and interact with one another and with one or more applications. For example, the computing device 102 can determine the state of a user interface associated with a telephone application. The state of the user interface can include one or more functionalities and/or one or more locations of the numeric keypad controls, the call control, and the hang-up control. In some embodiments, determination of the state of the user interface can include the use of one or more machine-learning models that have been configured and/or trained to receive an input including the user interface data (e.g., user interface data including an image of the user interface, a node hierarchy of the user interface, and/or information associated with the one or more functionalities of the user interface), perform one or more operations on the input, and generate an output including the state of the user interface.

At 1206, the method 1200 can include mapping the one or more interface elements to one or more simplified user interface elements. Mapping the one or more interface elements to the one or more simplified user interface elements can be based at least in part on the one or more functionalities of the one or more interface elements. For example, the computing device 102 can map the one or more interface elements to one or more simplified user interface elements by comparing the one or more interface elements to the one or more simplified user interface elements and determining the one or more interface elements that match or are similar to one or more attributes of the one or more simplified user interface elements. The one or more interface elements that satisfy one or more criteria associated with the extent (e.g., the number of attributes that match, which types of attributes match, and/or a weighting between the number and/or types of attributes that match) to which the one or more interface elements match or are similar to the one or more simplified user interface elements can be mapped to the one or more simplified user interface elements.

At 1208, the method 1200 can include generating a simplified user interface. Generating the simplified user interface can be based at least in part on the one or more simplified user interface elements. Any of the one or more simplified user interface elements can be configured to perform one or more operations which can include one or more operations associated with the one or more functionalities of the one or more interface elements. For example, the computing device 102 can perform one or more operations to implement the simplified user interface, including rendering one or more images of the one or more simplified user interface elements on a display device (e.g., generating a graphical user interface that includes a simplified user interface as an overlay on the user interface), generating audible output including synthetic voice instructions (e.g., generating instructions that request a vocal command from a user) based on the one or more user interface elements, and/or illuminating a portion of the user interface to indicate that it can receive input (e.g., illuminating a button with red lighting to indicate that the button can be pressed to end a phone call).

At 1210, the method 1200 can include determining one or more proposed simplified user interface elements for each of the one or more interface elements that do not match the one or more simplified user interface elements. For example, the computing device 102 can determine the one or more interface elements with one or more attributes that do not match a predetermined amount (e.g., a predetermined number of the one or more attributes) or type of one or more attributes of the one or more simplified user interface elements. The one or more interface elements that do not match a predetermined amount or type of attributes of the one or more simplified user interface elements can be associated with one or more proposed simplified user interface elements that are within a predetermined range of similarity. For example, a match can be determined not to have occurred when less than seventy-five (75) percent of the one or more attributes of the one or more interface elements and the one or more proposed simplified user interface elements match. By way of further example, the computing device 102 can include one or more machine-learning models that are configured and/or trained to determine the one or more proposed simplified user interface elements based at least in part on the one or more one or more interface elements that do not match a predetermined amount or type of attributes of the one or more simplified user interface elements.

In some embodiments, the one or more proposed simplified user interface elements can include one or more simplified user interface elements that were not mapped to the one or more simplified user interface elements. Further, the one or more simplified user interface elements can respectively correspond to the one or more proposed simplified user interface elements that were not mapped to the one or more simplified user interface elements.

At 1212, the method 1200 can include generating a prompt. The prompt can include a request. The request can include a request for a user to select at least one of the one or more proposed simplified user interface elements. For example, the computing device 102 can generate a visual prompt on a display associated with the user interface and/or an auditory prompt via an audio output associated with the user interface. The prompt can list the one or more proposed simplified user interface elements, each of which can be associated with a respective corresponding one or more interface elements. For example, the prompt can request the user to "PLEASE INDICATE THE SIMPLIFIED USER INTERFACE ELEMENTS THAT CORRECTLY MATCH THE INTERFACE ELEMENTS OF THE USER INTERFACE." In some embodiments, the one or more proposed simplified user interface elements selected by the user and/or the one or more proposed simplified user interface elements not selected by the user can be used to configure and/or train one or more machine-learning models to determine the one or more proposed simplified user interface elements and/or to map the one or more interface elements to the one or more simplified user interface elements.

Figure 13:
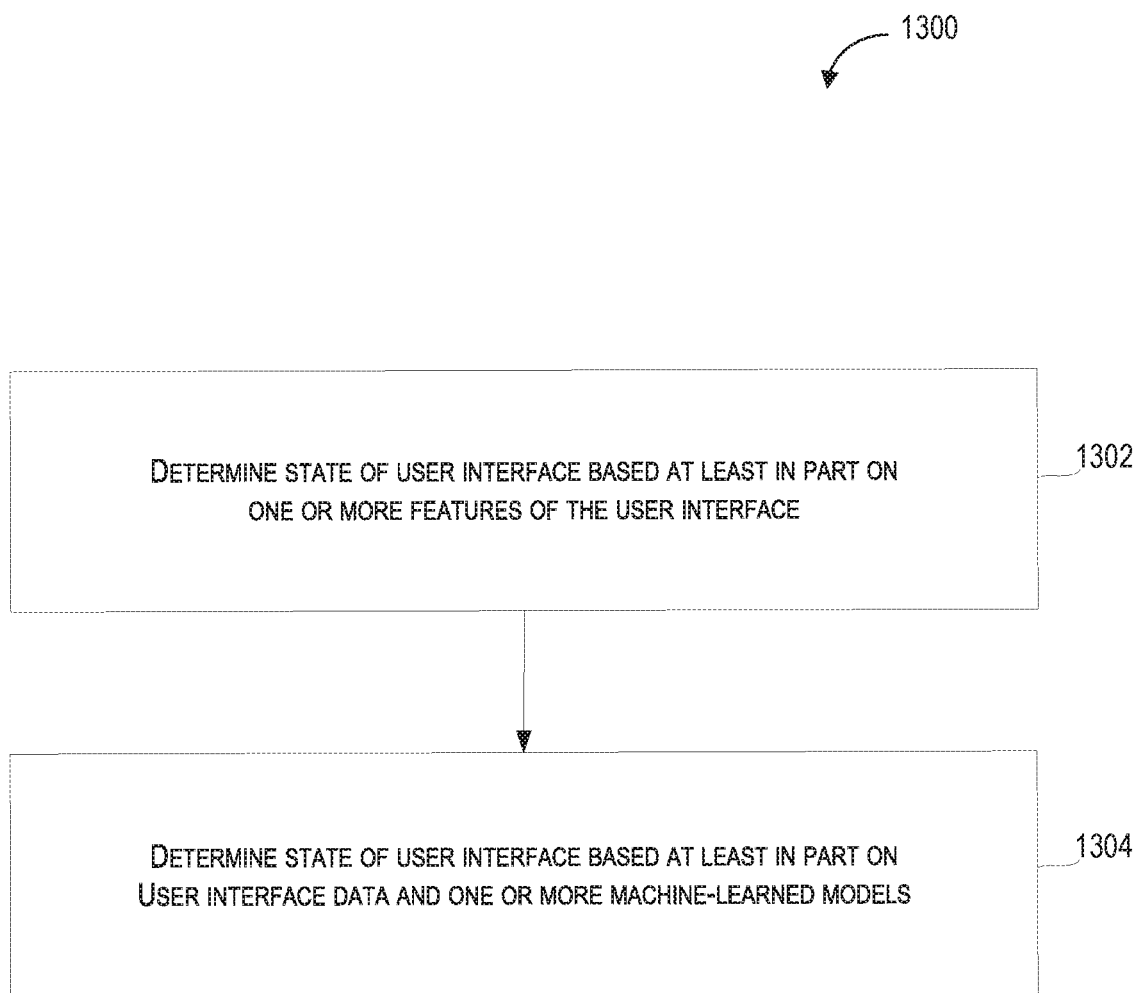
FIG. 13 depicts a flow diagram of simplified user interface generation according to example embodiments of the present disclosure.

FIG. 13 depicts a flow diagram of simplified user interface generation according to example embodiments of the present disclosure. One or more portions of the method 1300 can be executed and/or implemented on one or more computing devices or computing systems including, for example, the computing device 102, the computing system 130, the training computing system 150, and/or the user computing device 300. Further, one or more portions of the method 1300 can be executed or implemented as an algorithm on the hardware devices or systems disclosed herein. In some embodiments, one or more portions of the method 1300 can be performed as part of the method 1200 that is depicted in FIG. 12. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining the state of the user interface based at least in part on one or more features of the user interface. The computing device 102 can perform one or more operations to analyze one or more visual features of the user interface including one or more locations of the one or more interface elements and the respective appearance of the one or more interface elements. For example, analysis of the one or more visual features can be based at least in part on analysis of one or more screen captures of the user interface. The computing device 102 can then determine the state of the user interface based at least in part on the one or more visual features of the one or more interface elements.

In some embodiments, determining the state of the user interface can include generating an input that can be provided to one or more machine-learned models that are configured and/or trained to determine one or more states of the user interface.

At 1304, the method 1300 can include determining the state of the user interface based at least in part on the user interface data and/or one or more machine-learned models. The one or more machine-learned models can be configured to classify the one or more interface elements into one or more classes (e.g., semantic classes) respectively. For example, the user interface data including one or more visual features of the user interface can be provided as an input to the one or more machine-learned models which can be configured and/or trained to associate the one or more visual features of the user interface with respective simplified user interface element of the one or more simplified user interface elements.

Figure 14:
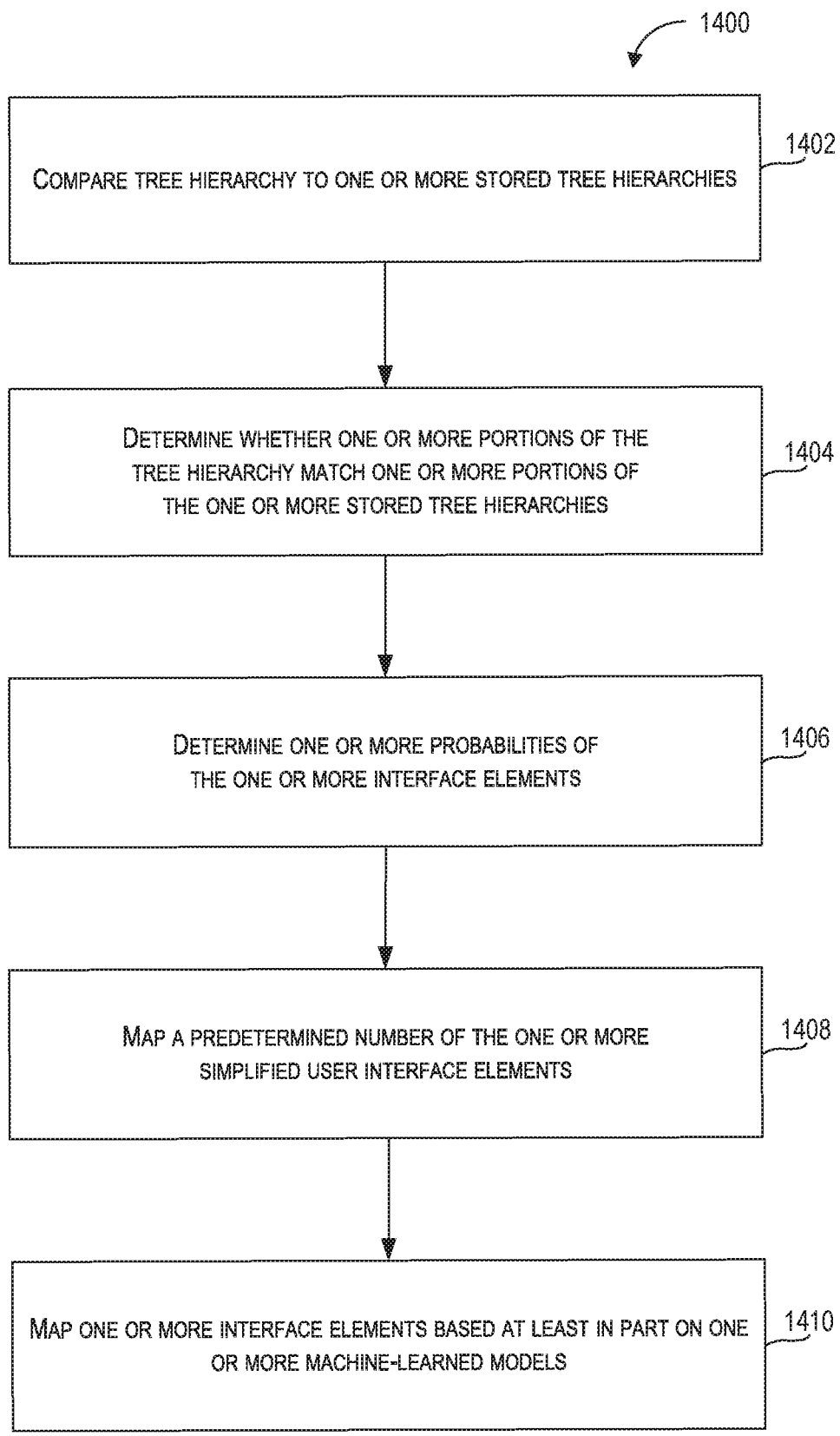
FIG. 14 depicts a flow diagram of simplified user interface generation according to example embodiments of the present disclosure.

FIG. 14 depicts a flow diagram of simplified user interface generation according to example embodiments of the present disclosure. One or more portions of the method 1400 can be executed and/or implemented on one or more computing devices or computing systems including, for example, the computing device 102, the computing system 130, the training computing system 150, and/or the user computing device 300. Further, one or more portions of the method 1400 can be executed or implemented as an algorithm on the hardware devices or systems disclosed herein. In some embodiments, one or more portions of the method 1400 can be performed as part of the method 1200 that is depicted in FIG. 12. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include comparing the tree hierarchy to one or more stored tree hierarchies associated with one or more stored interface elements. For example, the computing device 102 can perform one or more tree hierarchy or node hierarchy comparison operations including comparing the types of nodes (e.g., the one or more functionalities associated with each node in the tree hierarchy) in the tree hierarchy to one or more stored tree hierarchies, comparing the connections (e.g., which other nodes is a node connected to) between nodes in the tree hierarchy to the connections between nodes in the one or more stored tree hierarchies, and/or comparing the size of the tree hierarchy (e.g., the number of nodes in a tree hierarchy and/or the distance from the top leaf of the tree hierarchy to the furthest bottom leaf of the tree hierarchy) to the to the sizes of the one or more stored tree hierarchies.

At 1404, the method 1400 can include determining whether or if one or more portions of the tree hierarchy match or are similar to one or more portions of the one or more stored tree hierarchies. The computing device 102 can determine whether the tree hierarchy matches or is similar to the one or more portions of the one or more stored tree hierarchies based at least in part on the results of the one or more tree hierarchy comparison operations. Further, a greater extent of matching and/or similarity can be associated with a greater number of similar types of nodes between the one or more portions of the tree hierarchy match and one or more portions of the one or more stored tree hierarchies, a greater number of connections in the one or more portions of the tree hierarchy that match one or more portions of the one or more stored tree hierarchies, and/or a greater similarity in the size of the one or more portions of the tree hierarchy match compared to the one or more portions of the one or more stored tree hierarchies.

At 1406, the method 1400 can include determining one or more probabilities or likelihoods of each of the one or more interface elements receiving a user interaction. For example, the computing device 102 after determining the one or more functionalities of the one or more interface elements and/or the context of the user interface (e.g., the application that is operating, the sub-set of the user interface within which an interface element is being used), the computing device 102 can access interaction probability data that includes the probability of the one or more interface elements receiving a user interaction (e.g., a user touching an interface element that controls an operation of an application).

At 1408, the method 1400 can include mapping a predetermined number of the one or more simplified user interface elements to a respective number of the one or more interface elements with a probability of interaction that satisfies one or more interaction criteria. For example, the computing device 102 can map the one or more simplified user interface elements to the one or more interface elements that have the highest probability of receiving a user interaction and/or map the one or more simplified user interface elements to the one or more interface elements that satisfy (e.g., exceed) a threshold probability. For example, the computing device 102 can determine that the simplified user interface can accommodate four simplified user interface elements and can map the four interface elements with the highest probabilities of interaction to the four simplified user interface elements.

At 1410, the method 1400 can include mapping the one or more interface elements to the one or more simplified user interface elements based at least in part on one or more machine-learned models. The one or more machine-learned models are configured to determine one or more features of the one or more interface elements that match the one or more simplified user interface elements. For example, the user computing device 102 can provide input including the user interface data and/or the state of the user interface to one or more machine-learned models that are configured and/or trained to map the one or more interface elements to one or more simplified user interface elements.

Figure 15:
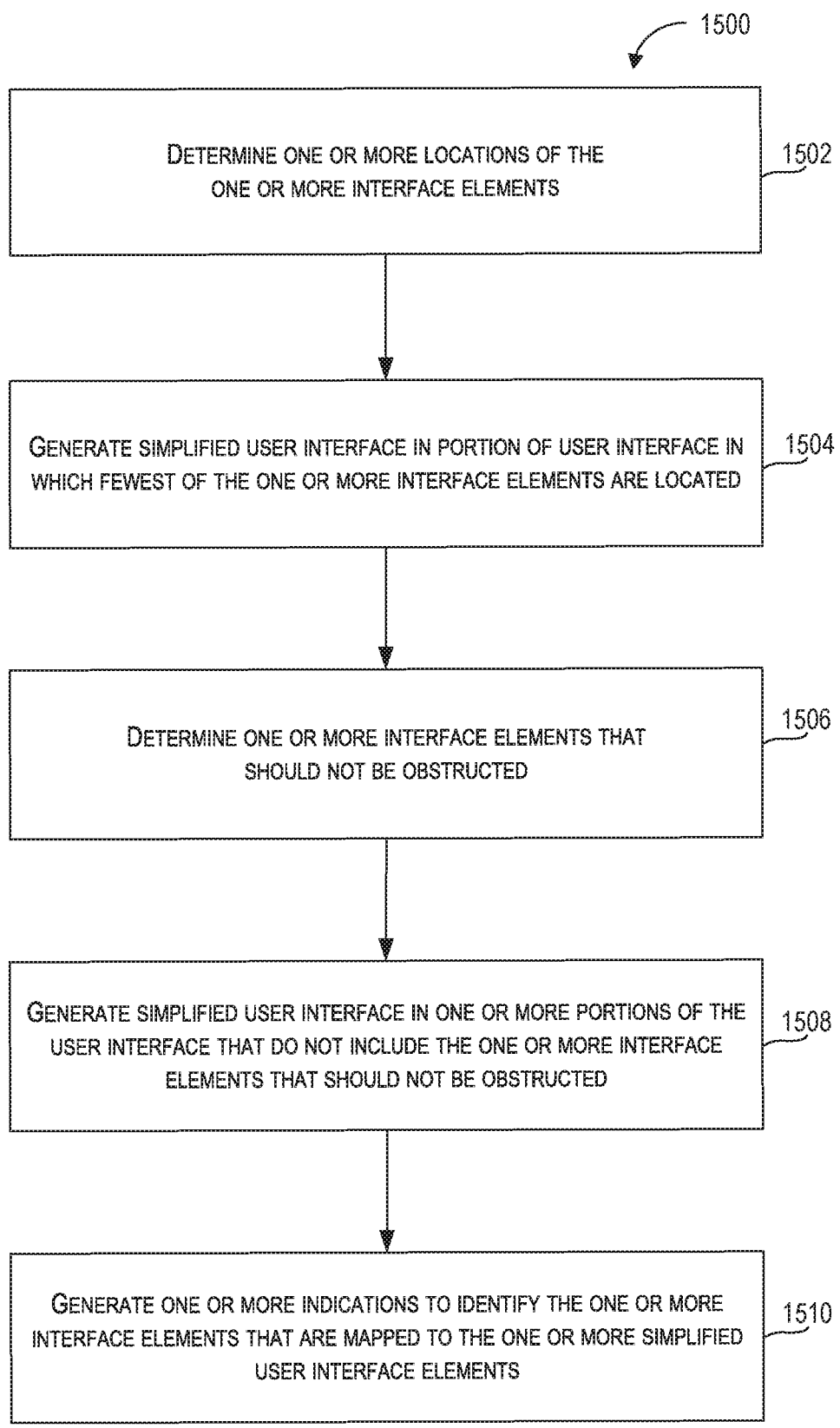
FIG. 15 depicts a flow diagram of simplified user interface generation according to example embodiments of the present disclosure.

FIG. 15 depicts a flow diagram of simplified user interface generation according to example embodiments of the present disclosure. One or more portions of the method 1500 can be executed and/or implemented on one or more computing devices or computing systems including, for example, the computing device 102, the computing system 130, the training computing system 150, and/or the user computing device 300. Further, one or more portions of the method 1500 can be executed or implemented as an algorithm on the hardware devices or systems disclosed herein. In some embodiments, one or more portions of the method 1500 can be performed as part of the method 1200 that is depicted in FIG. 12. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include determining, based at least in part on the user interface data, one or more locations of the one or more interface elements respectively. For example, the computing device 102 can use the user interface data (which can include information associated with the one or more locations of the one or more interface elements) to determine one or more relative locations (e.g., relative to one or more other interface elements), and/or one or more absolute locations (e.g., absolute with respect to the user interface) of the one or more interface elements.

At 1504, the method 1500 can include generating the simplified user interface in a portion of the user interface in which the fewest of the one or more interface elements are located. For example, the computing device 102 can determine that the bottom quarter portion of the user interface does not have any interface elements and that the top quarter portion of the user interface has four interface elements. The computing device 102 can generate the simplified user interface in the bottom quarter portion of the user interface.

At 1506, the method 1500 can include determining, based at least in part on the user interface data, the one or more interface elements that should not be obstructed. The computing device 102 can use the user interface data to determine the one or more interface elements that are associated with one or more functionalities that may be deemed to be necessary (e.g., an interface element that is used to exit or close an application) for proper operation of the application.

At 1508, the method 1500 can include generating the simplified user interface in one or more portions of the user interface that do not include the one or more interface elements that should not be obstructed. The computing device 102 can generate the simplified user interface in a portion of the user interface that does not include an interface element that is used to close or exit the application that is currently being used.

At 1510, the method 1500 can include generating one or more indications to identify the one or more interface elements that are mapped to the one or more simplified user interface elements. For example, the computing device 102 can render a green border around the one or more interface elements that are mapped to the one or more simplified user interface elements. Further, the computing device 102 can generate a yellow highlight around the one or more interface elements that are mapped to the one or more simplified user interface elements.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of user interface generation, the computer-implemented method comprising:
   accessing, by a user computing device associated with a user and comprising one or more processors, user interface data comprising one or more states of a user interface comprising one or more interface elements;
   determining, by the user computing device, a state of the user interface based at least in part on the user interface data, wherein the state of the user interface comprises one or more functionalities of the one or more interface elements;
   mapping, by the user computing device, the one or more interface elements to one or more simplified user interface elements based at least in part on the one or more functionalities of the one or more interface elements, wherein the one or more interface elements are grouped into one or more element classes respectively mapped to the one or more simplified user interface elements, and wherein the mapping is configured for representing one or more members of a respective element class with a respective simplified user interface element corresponding to the respective element class; and
   generating, by the user computing device, a simplified user interface based at least in part on the one or more simplified user interface elements, wherein the one or more simplified user interface elements are configured to perform one or more operations associated with the one or more functionalities of the one or more interface elements.

2. The computer-implemented method of claim 1, wherein the user interface is configured to receive one or more task-directed inputs or one or more task-auxiliary inputs, and wherein the user interface is configured to generate one or more task-directed outputs or one or more task-auxiliary outputs, wherein the one or more task-directed inputs or the one or more task-directed outputs are associated with one or more tasks that are extrinsic to user interaction with the user interface, and wherein the one or more task-auxiliary inputs or the one or more task-auxiliary outputs are associated with one or more tasks that are not extrinsic to user interaction with the user interface.

3. The computer-implemented method of claim 1, wherein the determining, by the user computing device, a state of the user interface based at least in part on the user interface data comprises:
   determining, by the user computing device, the state of the user interface based at least in part on one or more features of the user interface, wherein the one or more features of the user interface comprises one or more text labels associated with the one or more interface elements, a visual appearance of the one or more interface elements, one or more sizes of the one or more interface elements, one or more locations of the one or more interface elements, one or more input modalities of the one or more interface elements, or one or more output modalities of the one or more interface elements.

4. The computer-implemented method of claim 1, wherein the determining, by the user computing device, a state of the user interface based at least in part on the user interface data, wherein the state of the user interface comprises one or more functionalities of the one or more interface elements comprises:
   determining, by the user computing device, the state of the user interface based at least in part on the user interface data and one or more machine-learned models, wherein the one or more machine-learned models are configured to classify the one or more interface elements into one or more semantic classes respectively, and wherein each of the one or more semantic classes is associated with a respective simplified user interface element of the one or more simplified user interface elements.

5. The computer-implemented method of claim 4, wherein the one or more interface elements or the one or more simplified user interface elements are clustered into the one or more semantic classes based at least in part on one or more features of the one or more interface elements.

6. The computer-implemented method of claim 1, wherein the user interface data comprises a tree hierarchy associated with the one or more interface elements, and wherein the mapping, by the user computing device, the one or more interface elements to one or more simplified user interface elements based at least in part on the one or more functionalities of the one or more interface elements comprises:
   comparing, by the user computing device, the tree hierarchy to one or more stored tree hierarchies associated with one or more stored interface elements; and
   determining, by the user computing device, whether one or more portions of the tree hierarchy match one or more portions of the one or more stored tree hierarchies.

7. The computer-implemented method of claim 6, wherein the tree hierarchy is associated with an application programming interface (API) that defines one or more attributes of the one or more interface elements, and wherein the one or more attributes comprise one or more attributes associated with labels on the one or more interface elements, one or more attributes associated with accessibility markup on the one or more interface elements, attributes associated with a layout of the one or more interface elements, attributes associated with one or more respective inputs of the one or more interface elements, attributes associated with one or more respective outputs of the one or more interface elements, or attributes associated with an appearance of the one or more interface elements.

8. The computer-implemented method of claim 1, wherein the mapping, by the user computing device, the one or more interface elements to one or more simplified user interface elements based at least in part on the one or more functionalities of the one or more interface elements comprises:
determining, by the user computing device, one or more probabilities of each of the one or more interface elements receiving a user interaction; and
mapping, by the user computing device, a predetermined number of the one or more simplified user interface elements to a respective number of the one or more interface elements that satisfy a threshold probability of receiving a user interaction.

9. The computer-implemented method of claim 1, wherein the mapping, by the user computing device, the one or more interface elements to one or more simplified user interface elements based at least in part on the one or more functionalities of the one or more interface elements comprises:
mapping, by the user computing device, the one or more interface elements to the one or more simplified user interface elements based at least in part on one or more machine-learned models, wherein the one or more machine-learned models are configured to determine one or more features of the one or more interface elements that match the one or more simplified user interface elements.

10. The computer-implemented method of claim 1, further comprising:
determining, by the user computing device, one or more proposed simplified user interface elements for each of the one or more interface elements that do not match the one or more simplified user interface elements; and
generating, by the user computing device, a prompt comprising a request for a user to select at least one of the one or more proposed simplified user interface elements.

11. The computer-implemented method of claim 1, wherein the generating, by the user computing device, a simplified user interface based at least in part on the one or more simplified user interface elements, wherein the one or more simplified user interface elements are configured to perform one or more operations associated with the one or more functionalities of the one or more interface elements comprises:
determining, by the user computing device, based at least in part on the user interface data, one or more locations of the one or more interface elements respectively; and
generating, by the user computing device, the simplified user interface in a portion of the user interface in which the fewest of the one or more interface elements are located.

12. The computer-implemented method of claim 1, wherein the generating, by the user computing device, a simplified user interface based at least in part on the one or more simplified user interface elements, wherein the one or more simplified user interface elements are configured to perform one or more operations associated with the one or more functionalities of the one or more interface elements comprises:
determining, by the user computing device, based at least in part on the user interface data, the one or more interface elements that should not be obstructed; and
generating, by the user computing device, the simplified user interface in one or more portions of the user interface that do not include the one or more interface elements that should not be obstructed.

13. The computer-implemented method of claim 1, further comprising: generating, by the user computing device, one or more indications to identify the one or more interface elements that are mapped to the one or more simplified user interface elements, wherein the one or more indications comprise one or more highlights of the one or more interface elements, one or more color changes of the one or more interface elements, one or more changes to a brightness of the one or more interface elements, one or more markings on the one or more interface elements, or one or more shapes around the one or more interface elements.

14. The computer-implemented method of claim 1, wherein the simplified user interface is presented in a separate region or device from the user interface or the simplified user interface is superimposed over a portion of the user interface.

15. One or more tangible non-transitory computer-readable media storing computer-readable instructions that when executed by one or more processors cause the one or more processors to perform operations, the operations comprising:
accessing user interface data comprising one or more states of a user interface comprising one or more interface elements;
determining a state of the user interface based at least in part on the user interface data, wherein the state of the user interface comprises one or more functionalities of the one or more interface elements;
mapping the one or more interface elements to one or more simplified user interface elements based at least in part on the one or more functionalities of the one or more interface elements, wherein the one or more interface elements are grouped into one or more element classes respectively mapped to the one or more simplified user interface elements, and wherein the mapping is configured for representing one or more members of a respective element class with a respective simplified user interface element corresponding to the respective element class; and
generating a simplified user interface based at least in part on the one or more simplified user interface elements, wherein the one or more simplified user interface elements are configured to perform one or more operations associated with the one or more functionalities of the one or more interface elements.

16. The one or more tangible non-transitory computer-readable media of claim 15, wherein the simplified user interface is associated with control of an application, and wherein the one or more simplified user interface elements comprise one or more predetermined application controls or a control to remove the simplified user interface.

17. The one or more tangible non-transitory computer-readable media of claim 16, wherein the application comprises a text messaging application, an e-mail application, or a telephone application, and wherein the one or more predetermined application controls comprise one or more message templates, one or more predetermined geographic locations, or one or more predetermined user contacts.

18. A computing system comprising:
one or more processors;
one or more non-transitory computer-readable media storing instructions that when executed by the one or more processors cause the one or more processors to perform operations, the operations comprising:
accessing user interface data comprising one or more states of a user interface comprising one or more interface elements;
determining a state of the user interface based at least in part on the user interface data, wherein the state of the user interface comprises one or more functionalities of the one or more interface elements;
mapping the one or more interface elements to one or more simplified user interface elements based at least in part on the one or more functionalities of the one or more interface elements, wherein the one or more interface elements are grouped into one or more element classes respectively mapped to the one or more simplified user interface elements, and wherein the mapping is configured for representing one or more members of a respective element class with a respective simplified user interface element corresponding to the respective element class; and
generating a simplified user interface based at least in part on the one or more simplified user interface elements, wherein the one or more simplified user interface elements are configured to perform one or more operations associated with the one or more functionalities of the one or more interface elements.

19. The computing system of claim 18, wherein the simplified user interface is associated with an input modality that is different from that of the user interface, and wherein the input modality of the simplified user interface comprises a touch input modality, an audio input modality, or a gesture input modality.

20. The computing system of claim 18, wherein the simplified user interface is associated with an output modality that is different from that of the user interface, and wherein the output modality of the simplified user interface comprises a visual output modality, an auditory output modality, or a tactile output modality.

* * * * *